(12) United States Patent
Nehlen, III

(10) Patent No.: US 12,330,094 B2
(45) Date of Patent: *Jun. 17, 2025

(54) REGENERATIVE MEDIA FILTRATION

(71) Applicant: Paul F. Nehlen, III, Delavan, WI (US)

(72) Inventor: Paul F. Nehlen, III, Delavan, WI (US)

(73) Assignee: Blue Skies Global LLC, Williams Bay, WI (US)

( * ) Notice: Subject to any disclaimer, the term of this patent is extended or adjusted under 35 U.S.C. 154(b) by 583 days.

This patent is subject to a terminal disclaimer.

(21) Appl. No.: 17/227,718

(22) Filed: Apr. 12, 2021

(65) Prior Publication Data

US 2021/0229006 A1   Jul. 29, 2021

Related U.S. Application Data

(63) Continuation of application No. 16/677,900, filed on Nov. 8, 2019, now Pat. No. 10,981,091, which is a
(Continued)

(51) Int. Cl.
| | | |
|---|---|---|
| *B01D 29/52* | (2006.01) | |
| *B01D 29/15* | (2006.01) | |
| *B01D 29/17* | (2006.01) | |
| *B01D 29/90* | (2006.01) | |
| *B01D 37/02* | (2006.01) | |

(52) U.S. Cl.
CPC ............. *B01D 29/52* (2013.01); *B01D 29/15* (2013.01); *B01D 29/17* (2013.01); *B01D 29/90* (2013.01); *B01D 37/02* (2013.01); *B01D 2201/0423* (2013.01); *B01D 2201/0446* (2013.01);
(Continued)

(58) Field of Classification Search
None
See application file for complete search history.

(56) References Cited

U.S. PATENT DOCUMENTS

| | | | | |
|---|---|---|---|---|
| 171,056 | A * | 12/1875 | Sinclaire ................ | B01D 35/18 |
| | | | | 351/63 |
| 385,333 | A * | 6/1888 | Way ....................... | B01D 29/15 |
| | | | | 210/454 |

(Continued)

FOREIGN PATENT DOCUMENTS

| | | |
|---|---|---|
| GB | 778524 | 7/1957 |
| WO | 03/055570 | 7/2003 |

*Primary Examiner* — Robert J Popovics
(74) *Attorney, Agent, or Firm* — Salter & Michaelson

(57) ABSTRACT

A regenerative filter that includes a filter housing having inlet and outlet zones; a fluid path provided between the inlet and outlet zones; a plurality of filter elements each having an outer surface filter media applied thereto and functioning to filter particulate or contaminants from the fluid path; and a tube sheet that is supported across the filter housing, that is disposed just before the outlet zone and that provides the support for the plurality of filter elements. The plurality of filter elements are disposed in an array and includes bridging members or elements that connect between adjacent filter elements, and that forms with the filter elements, a closed interstitial space between adjacent filter elements for liquid flow; a nanoscale barrier on interior surfaces, including that of the regenerative media itself, providing a mechanism to disrupt the cell wall of microscopic viruses and organisms.

19 Claims, 35 Drawing Sheets

Related U.S. Application Data continuation of application No. 16/543,747, filed on Aug. 19, 2019, now Pat. No. 10,814,255, which is a continuation of application No. 16/047,437, filed on Jul. 27, 2018, now Pat. No. 10,406,458.

(60) Provisional application No. 62/655,468, filed on Apr. 10, 2018, provisional application No. 62/647,006, filed on Mar. 23, 2018.

(52) U.S. Cl.
CPC ............... *B01D 2201/0461* (2013.01); *B01D 2201/0484* (2013.01)

(56) References Cited

U.S. PATENT DOCUMENTS

| | | | | |
|---|---|---|---|---|
| 582,404 A * | 5/1897 | Stifel | B01D 24/02 | 210/110 |
| 654,592 A * | 7/1900 | Barr | B01D 29/15 | 210/411 |
| 1,203,835 A * | 11/1916 | Zahm | C02F 1/003 | 210/85 |
| 1,706,400 A * | 3/1929 | Diamond | B01D 29/11 | 210/323.2 |
| 1,738,114 A * | 12/1929 | Olson | B01D 29/27 | 210/486 |
| 1,922,315 A * | 8/1933 | Mooz | B01D 29/46 | 210/488 |
| 1,992,101 A * | 2/1935 | Stuart | B01D 29/46 | 210/488 |
| 2,064,510 A | 12/1936 | Wells | | |
| 2,083,578 A * | 6/1937 | Roberts | C10G 73/025 | 210/772 |
| 2,167,236 A * | 7/1939 | Gieseler | B01D 46/76 | 55/304 |
| 2,230,174 A * | 1/1941 | Beale | B01D 29/92 | 210/318 |
| 2,301,430 A * | 11/1942 | Malanowski | B01D 29/52 | 210/497.1 |
| 2,327,648 A | 8/1943 | Kasten | | |
| 2,374,976 A | 5/1945 | Briggs et al. | | |
| 2,423,172 A * | 7/1947 | Booth | B01D 29/33 | 210/411 |
| 2,468,603 A * | 4/1949 | Pew | B01D 29/114 | 210/323.2 |
| 2,475,561 A * | 7/1949 | Cooperider | B01D 33/21 | 210/324 |
| 2,487,769 A * | 11/1949 | Ebert | B01D 29/52 | 210/411 |
| 2,523,793 A * | 9/1950 | Vance | B01D 17/0202 | 210/DIG. 5 |
| 2,547,277 A | 4/1951 | Marsh et al. | | |
| 2,562,699 A | 7/1951 | Cooperson et al. | | |
| 2,570,132 A * | 10/1951 | Koupal | B01D 29/114 | 210/323.1 |
| 2,578,636 A * | 12/1951 | Smith | B01D 29/72 | 210/791 |
| 2,600,458 A * | 6/1952 | Ackley | B01D 29/114 | 210/135 |
| 2,605,903 A * | 8/1952 | Schuller | B01D 35/00 | 210/399 |
| 3,055,290 A * | 9/1952 | Arvanitakis | B01D 33/0183 | 210/407 |
| 2,693,882 A * | 11/1954 | Ebert | B01D 29/52 | 210/345 |
| 2,710,099 A * | 6/1955 | Kalinske | B01D 29/48 | 210/323.2 |
| 2,731,107 A * | 1/1956 | Hersey, Jr. | B01D 29/15 | 55/284 |
| 2,742,158 A * | 4/1956 | Schuller | B01D 29/52 | 210/345 |
| 2,744,632 A * | 5/1956 | Gardes | B01D 29/54 | 210/323.2 |
| 2,754,005 A * | 7/1956 | Tursky | B01D 29/48 | 210/450 |
| 2,757,799 A * | 8/1956 | Ritchie | B01D 37/00 | 210/345 |
| 2,780,363 A * | 2/1957 | Pew | B01D 29/66 | 210/411 |
| 2,784,846 A * | 3/1957 | Ebert | B01D 29/52 | 210/456 |
| 2,819,800 A * | 1/1958 | Goodloe | B01D 25/00 | 210/488 |
| 2,834,473 A * | 5/1958 | Battey | B01D 29/66 | 210/333.01 |
| 2,848,112 A * | 8/1958 | Hass | B01D 29/66 | 210/333.01 |
| 2,862,622 A * | 12/1958 | Jones | B01D 29/66 | 210/411 |
| 2,872,044 A * | 2/1959 | Kasten | B01D 25/00 | 210/488 |
| 2,954,873 A * | 10/1960 | Davis | B01D 29/52 | 210/411 |
| 3,034,652 A * | 5/1962 | Hobson, Jr. | B01D 29/52 | 210/232 |
| 3,042,214 A * | 7/1962 | Arvanitakis | B01D 35/16 | 210/330 |
| 3,048,275 A | 8/1962 | Headrick | | |
| 3,080,060 A * | 3/1963 | Blumenkranz | B01D 29/114 | 210/429 |
| 3,100,190 A * | 8/1963 | Hobson, Jr. | B01D 29/52 | 210/497.1 |
| 3,149,072 A | 9/1964 | Silverman | | |
| 3,155,613 A * | 11/1964 | Felix | B01D 35/20 | 210/232 |
| 3,169,109 A * | 2/1965 | Hirs | B01D 35/12 | 210/138 |
| 3,212,643 A * | 10/1965 | Zievers | B01D 29/72 | 55/300 |
| 3,225,933 A * | 12/1965 | Berline | B01D 29/15 | 40/518 |
| 3,251,473 A * | 5/1966 | Fuhring | D06F 43/085 | 210/167.31 |
| 3,262,568 A * | 7/1966 | Zehrbach | B01D 29/114 | 210/138 |
| 3,280,978 A * | 10/1966 | Scott | B01D 29/885 | 210/408 |
| 3,289,847 A | 12/1966 | Rothemund | | |
| 3,291,310 A * | 12/1966 | Marvel | B01D 29/21 | 210/167.13 |
| 3,310,175 A * | 3/1967 | Mclagan | B01D 37/02 | 55/296 |
| 3,312,352 A * | 4/1967 | Shiells | B01D 29/114 | 210/323.2 |
| 3,330,415 A * | 7/1967 | Wilke | B01D 29/39 | 210/236 |
| 3,356,215 A * | 12/1967 | Miles, Jr. | B01D 37/04 | 210/333.1 |
| 3,365,065 A * | 1/1968 | Varjabedian | B01D 29/52 | 55/341.1 |
| 3,394,815 A * | 7/1968 | Harms | B01D 29/52 | 210/457 |
| 3,407,572 A * | 10/1968 | Tolley | B01D 46/76 | 55/299 |
| 3,416,669 A * | 12/1968 | Hubbard | B01D 29/668 | 210/411 |
| 3,422,958 A * | 1/1969 | Newman | B01D 35/16 | 210/457 |
| 3,447,690 A * | 6/1969 | Kracklauer | B01D 29/6484 | 55/299 |
| 3,482,700 A * | 12/1969 | Bebech | B01D 29/72 | 210/407 |
| 3,497,452 A * | 2/1970 | Arvanitakis | B01D 33/37 | 210/663 |
| 3,540,190 A * | 11/1970 | Brink | B01D 46/24 | 55/423 |

(56) References Cited

U.S. PATENT DOCUMENTS

| | | | | |
|---|---|---|---|---|
| 3,556,304 A | * | 1/1971 | Collard | B01D 37/02 210/489 |
| 3,623,910 A | * | 11/1971 | Calhoun et al. | B01D 46/70 96/228 |
| 3,633,753 A | | 1/1972 | Petitjean | |
| 3,637,079 A | * | 1/1972 | Strub | B01D 29/94 210/794 |
| 3,642,141 A | * | 2/1972 | Hobson, Jr. | B01D 29/15 210/457 |
| 3,715,033 A | | 2/1973 | Soriente | |
| 3,736,641 A | * | 6/1973 | Fosdick | B21C 37/124 29/896.62 |
| 3,744,633 A | * | 7/1973 | Schmidt, Jr. | B01D 29/94 210/785 |
| 3,750,889 A | * | 8/1973 | Acosta | B01D 29/52 210/499 |
| 3,780,868 A | * | 12/1973 | Miles, II | B01D 29/54 210/333.1 |
| 3,796,316 A | * | 3/1974 | Matz | B01D 29/52 100/116 |
| 3,891,551 A | * | 6/1975 | Tiedemann | B01D 29/661 210/323.1 |
| 3,970,564 A | * | 7/1976 | Shamsutdinov | B01D 29/41 210/791 |
| 4,033,875 A | | 7/1977 | Besik | |
| 4,089,664 A | * | 5/1978 | Noland | B01D 46/02 55/374 |
| 4,089,781 A | * | 5/1978 | Asp | B01D 29/52 210/411 |
| 4,094,784 A | * | 6/1978 | Hirano | B01D 33/52 210/780 |
| 4,134,836 A | | 1/1979 | Rowley et al. | |
| 4,153,552 A | * | 5/1979 | Muther | B01D 29/66 210/427 |
| 4,201,674 A | * | 5/1980 | Schwinghammer | B01D 29/114 210/411 |
| 4,246,114 A | * | 1/1981 | Krebs | C02F 3/1242 210/220 |
| 4,265,771 A | * | 5/1981 | Lennartz | B01D 29/72 210/791 |
| 4,277,349 A | * | 7/1981 | Schwinghammer | B01D 29/114 134/113 |
| 4,289,630 A | * | 9/1981 | Schmidt, Jr. | B01D 29/843 55/300 |
| 4,317,732 A | * | 3/1982 | Shoquist | B01D 37/04 210/791 |
| 4,473,472 A | | 9/1984 | Muller | |
| 4,517,086 A | * | 5/1985 | Romey | B01D 29/72 210/334 |
| 4,526,688 A | * | 7/1985 | Schmidt, Jr. | B01D 29/15 210/489 |
| 4,526,689 A | * | 7/1985 | Morgan | B01D 29/117 210/345 |
| 4,552,669 A | * | 11/1985 | Sekellick | B01D 29/35 210/323.2 |
| 4,568,463 A | | 2/1986 | Klein | |
| 4,604,201 A | | 8/1986 | Muller | |
| 4,609,462 A | | 9/1986 | Flynn | |
| 4,657,673 A | | 4/1987 | Kessler | |
| 4,713,174 A | * | 12/1987 | Zievers | B01D 46/0005 55/379 |
| 4,725,356 A | * | 2/1988 | Zievers | B01D 29/52 210/450 |
| 4,735,638 A | * | 4/1988 | Ciliberti | F16F 1/04 55/498 |
| 4,741,841 A | * | 5/1988 | Borre | B01D 33/722 55/304 |
| 4,781,825 A | * | 11/1988 | Grimes | B01D 29/114 55/284 |
| 4,804,481 A | * | 2/1989 | Lennartz | B01D 29/52 210/791 |
| 4,830,747 A | * | 5/1989 | Kubota | B01D 29/66 134/22.12 |
| 4,836,922 A | * | 6/1989 | Rishel | B01D 33/0315 210/232 |
| 4,872,981 A | * | 10/1989 | Hobson, Jr. | B01D 29/90 210/420 |
| 4,919,801 A | * | 4/1990 | Hobson, Jr. | B01D 35/153 210/388 |
| 4,931,175 A | | 6/1990 | Krofta | |
| 5,061,303 A | * | 10/1991 | Williams | B01D 46/02 55/379 |
| 5,062,965 A | * | 11/1991 | Bernou | B01D 29/72 210/785 |
| 5,087,272 A | | 2/1992 | Nixdorf | |
| 5,128,038 A | | 7/1992 | Slavitschek et al. | |
| 5,209,844 A | * | 5/1993 | Zievers | B01D 29/114 210/411 |
| 5,227,076 A | * | 7/1993 | Bogen | B01D 29/66 210/791 |
| 5,230,131 A | * | 7/1993 | Hobson, Jr. | B01D 29/96 29/402.06 |
| 5,296,134 A | * | 3/1994 | Zaiter | B01D 29/66 55/482 |
| 5,358,552 A | * | 10/1994 | Seibert | B01D 46/79 95/281 |
| 5,397,465 A | * | 3/1995 | Stewart | B01D 29/39 210/167.13 |
| 5,407,570 A | * | 4/1995 | Hobson, Jr. | B01D 29/15 210/232 |
| 5,421,845 A | * | 6/1995 | Gregg | B01D 46/04 55/294 |
| 5,435,911 A | | 7/1995 | Hohle | |
| 5,441,633 A | * | 8/1995 | Schewitz | B01D 29/908 210/323.2 |
| 5,445,738 A | * | 8/1995 | Fry | B01D 33/0315 210/384 |
| 5,518,609 A | * | 5/1996 | Karlsson | B01D 29/15 210/97 |
| 5,525,221 A | * | 6/1996 | Hohle | B01D 29/15 210/323.2 |
| 5,628,916 A | * | 5/1997 | Stevens | B01D 29/52 210/799 |
| 5,693,362 A | * | 12/1997 | Boos | B01J 8/006 118/712 |
| 5,766,467 A | * | 6/1998 | Rech | B01D 29/15 55/508 |
| 5,766,486 A | * | 6/1998 | Cathcart | B01D 46/70 210/791 |
| 5,770,066 A | * | 6/1998 | Coates | B01D 29/668 210/450 |
| 5,779,897 A | * | 7/1998 | Kalthod | B01D 53/22 210/321.89 |
| 5,785,870 A | * | 7/1998 | Davis | B01D 29/48 210/488 |
| 5,792,353 A | * | 8/1998 | Jungi | B01D 29/48 210/357 |
| 5,804,072 A | * | 9/1998 | Yang | B01D 29/606 210/111 |
| 5,855,799 A | | 1/1999 | Herrmann | |
| 5,858,217 A | * | 1/1999 | Redl | B01D 29/52 210/414 |
| 5,876,471 A | * | 3/1999 | Lippert | B01D 46/58 55/508 |
| 5,945,006 A | * | 8/1999 | Mignani | B01D 29/114 210/411 |
| 5,948,257 A | * | 9/1999 | Custer | B01D 46/2407 210/508 |
| 5,963,709 A | | 10/1999 | Staples et al. | |
| 5,984,108 A | * | 11/1999 | Choi | B01D 29/114 210/791 |
| 6,007,718 A | | 12/1999 | Booth | |
| 6,102,212 A | * | 8/2000 | Strid | B01D 29/15 210/488 |

(56) References Cited

U.S. PATENT DOCUMENTS

| | | | |
|---|---|---|---|
| 6,123,746 A * | 9/2000 | Alvin | B01D 46/2407 |
| | | | 277/633 |
| 6,309,552 B1 | 10/2001 | Hobson, Jr. | |
| 6,342,158 B1 * | 1/2002 | Wills | B01D 29/15 |
| | | | 210/240 |
| 6,365,054 B1 * | 4/2002 | Kruger | B01D 29/52 |
| | | | 210/411 |
| 6,398,837 B1 * | 6/2002 | Alvin | B01D 39/2075 |
| | | | 55/486 |
| 6,419,842 B1 * | 7/2002 | Kupka | F26B 7/00 |
| | | | 210/330 |
| 6,428,593 B1 * | 8/2002 | Bruck | B01D 46/0002 |
| | | | 55/482 |
| 6,428,755 B1 * | 8/2002 | Rao | F01N 3/2832 |
| | | | 422/177 |
| 6,439,273 B1 * | 8/2002 | Kruger | B01D 29/114 |
| | | | 141/69 |
| 6,475,378 B1 * | 11/2002 | Shi | B01D 35/30 |
| | | | 210/90 |
| 6,495,037 B1 * | 12/2002 | Schuyler | B01D 29/114 |
| | | | 210/232 |
| 6,537,449 B2 | 3/2003 | Schewitz | |
| 6,616,842 B1 | 9/2003 | Soria et al. | |
| 6,860,394 B1 | 3/2005 | Mueller et al. | |
| 6,872,310 B2 * | 3/2005 | Trotzki | B01D 29/52 |
| | | | 210/345 |
| 6,981,516 B1 * | 1/2006 | VanOsdol | F16K 15/04 |
| | | | 137/550 |
| 7,487,875 B2 * | 2/2009 | Zimmerman | B01D 29/15 |
| | | | 210/345 |
| 7,998,353 B2 * | 8/2011 | Vandendijk | B01D 29/15 |
| | | | 210/232 |
| 8,021,467 B2 * | 9/2011 | Zimmer | B01D 46/58 |
| | | | 55/284 |
| 8,029,680 B2 * | 10/2011 | Shinoda | B01D 29/48 |
| | | | 210/777 |
| 8,201,695 B2 * | 6/2012 | Kang | B01D 35/10 |
| | | | 210/411 |
| 8,252,172 B2 | 8/2012 | Hall | |
| 8,303,688 B2 | 11/2012 | Sharma | |
| 8,309,711 B2 * | 11/2012 | Wiley | B01D 29/94 |
| | | | 210/411 |
| 8,465,571 B2 | 6/2013 | Billiet | |
| 8,465,654 B2 * | 6/2013 | Leonard | B01D 29/15 |
| | | | 210/232 |
| 8,764,975 B2 * | 7/2014 | Salmisuo | A61L 11/00 |
| | | | 422/26 |
| 8,795,528 B2 * | 8/2014 | Knox-Holmes | B01D 29/668 |
| | | | 210/330 |
| 9,108,872 B2 * | 8/2015 | Salmisuo | B09B 3/45 |
| 9,127,896 B1 | 9/2015 | Nehlen, III | |
| 9,149,742 B1 | 10/2015 | Nehlen, III | |
| 9,192,880 B2 * | 11/2015 | Mickan | B01D 29/52 |
| 9,302,205 B1 | 4/2016 | Nehlen, III | |
| 9,303,924 B1 | 4/2016 | Nehlen, III | |
| 9,387,421 B1 | 7/2016 | Nehlen, III | |
| 9,494,372 B2 | 11/2016 | Nehlen, III | |
| 9,581,395 B2 | 2/2017 | Nehlen, III | |
| 9,630,130 B2 | 4/2017 | Nehlen, III | |
| 10,058,802 B2 * | 8/2018 | Castaneda | B01D 29/52 |
| 10,406,458 B1 * | 9/2019 | Nehlen, III | B01D 29/52 |
| 10,596,497 B2 * | 3/2020 | Backman | B01D 33/466 |
| 10,814,255 B1 * | 10/2020 | Nehlen, III | B01D 29/17 |
| 10,814,256 B1 * | 10/2020 | Nehlen, III | B01D 29/15 |
| 10,850,216 B1 * | 12/2020 | Nehlen, III | B01D 29/15 |
| 10,981,091 B1 * | 4/2021 | Nehlen, III | B01D 29/90 |
| 11,065,566 B2 * | 7/2021 | Nehlen, III | B01D 29/906 |
| 11,167,226 B2 * | 11/2021 | Nehlen, III | B01D 37/02 |
| 11,229,865 B2 * | 1/2022 | Decker | B01D 46/2407 |
| 11,471,798 B2 * | 10/2022 | Vallejo | C02F 1/006 |
| 11,559,757 B2 * | 1/2023 | Ruzicka | B01D 35/30 |
| 11,673,079 B2 * | 6/2023 | Nehlen, III | B01D 29/17 |
| | | | 210/323.2 |
| 11,717,775 B2 * | 8/2023 | Maiworm | B01D 29/52 |
| | | | 210/323.1 |
| 11,958,002 B2 * | 4/2024 | Kim | B01D 29/15 |
| 12,215,555 B2 * | 2/2025 | John | B01D 37/046 |
| 12,239,924 B2 * | 3/2025 | Goldman | B01D 29/58 |
| 2002/0000405 A1 * | 1/2002 | Diemer | B01D 29/19 |
| | | | 210/323.2 |
| 2002/0038783 A1 * | 4/2002 | Trotzki | B01D 29/114 |
| | | | 210/407 |
| 2002/0158002 A1 * | 10/2002 | Trotzki | B01D 29/114 |
| | | | 210/384 |
| 2006/0051273 A1 | 3/2006 | Son | |
| 2006/0272319 A1 | 12/2006 | Dettling et al. | |
| 2007/0045173 A1 * | 3/2007 | Zimmerman | B01D 29/15 |
| | | | 210/450 |
| 2007/0251876 A1 * | 11/2007 | Krogue | B01D 39/2062 |
| | | | 210/497.1 |
| 2008/0029453 A1 | 2/2008 | Mertens et al. | |
| 2008/0149557 A1 * | 6/2008 | Reynders | B01D 29/15 |
| | | | 210/323.2 |
| 2009/0283481 A1 * | 11/2009 | Vandendijk | B01D 29/15 |
| | | | 210/232 |
| 2009/0297766 A1 | 12/2009 | Furuta | |
| 2010/0314309 A1 * | 12/2010 | Kang | B01D 29/114 |
| | | | 210/388 |
| 2011/0006015 A1 * | 1/2011 | Leonard | B01D 29/15 |
| | | | 210/489 |
| 2011/0031192 A1 * | 2/2011 | Wiley | B01D 29/52 |
| | | | 210/411 |
| 2013/0020248 A1 * | 1/2013 | Mickan | B01D 29/52 |
| | | | 210/345 |
| 2013/0239532 A1 * | 9/2013 | Sakashita | B01D 46/2484 |
| | | | 55/529 |
| 2013/0319928 A1 * | 12/2013 | Zuber | B01D 29/66 |
| | | | 210/440 |
| 2014/0144830 A1 * | 5/2014 | Isch | B01D 29/668 |
| | | | 210/323.2 |
| 2014/0305862 A1 * | 10/2014 | Zur | B01D 33/503 |
| | | | 210/333.01 |
| 2017/0282099 A1 * | 10/2017 | Park | B01D 29/46 |
| 2019/0291028 A1 * | 9/2019 | Nehlen, III | B01D 37/02 |
| 2019/0329145 A1 * | 10/2019 | Backman | B01D 33/466 |
| 2020/0086242 A1 * | 3/2020 | Mcfarlen | B01D 29/15 |
| 2020/0384387 A1 * | 12/2020 | Nehlen, III | B01D 29/52 |
| 2021/0039023 A1 * | 2/2021 | Nehlen, III | B01D 29/52 |
| 2021/0052996 A1 * | 2/2021 | Nehlen, III | B01D 37/02 |
| 2021/0086111 A1 * | 3/2021 | Nehlen, III | B01D 29/62 |
| 2021/0229006 A1 * | 7/2021 | Nehlen, III | B01D 29/52 |
| 2021/0245078 A1 * | 8/2021 | Maiworm | A23D 9/04 |
| 2021/0268409 A1 * | 9/2021 | Ruzicka | B01D 35/30 |
| 2021/0331098 A1 * | 10/2021 | Nehlen, III | B01D 24/047 |
| 2021/0346824 A1 * | 11/2021 | Curley | B01D 24/16 |
| 2021/0362083 A1 * | 11/2021 | Decker | B01D 46/2407 |
| 2021/0379521 A1 * | 12/2021 | Heidenreich | B01D 46/60 |
| 2022/0062802 A1 * | 3/2022 | Nehlen, III | B01D 29/90 |
| 2022/0080337 A1 * | 3/2022 | Kim | B01D 29/6438 |
| 2022/0143534 A1 * | 5/2022 | Vallejo | B01D 29/902 |
| 2022/0362690 A1 * | 11/2022 | Shaw | B01D 46/02 |
| 2023/0052718 A1 * | 2/2023 | Hawksley | B01D 29/15 |
| 2023/0149836 A1 * | 5/2023 | Hawksley | B01D 24/741 |
| 2023/0226470 A1 * | 7/2023 | Strasser | B01D 29/66 |
| | | | 210/798 |
| 2023/0226479 A1 * | 7/2023 | Strasser | B01D 46/2407 |
| | | | 55/350.1 |
| 2023/0271113 A1 * | 8/2023 | Kamath | B01D 24/38 |
| | | | 210/268 |
| 2024/0131456 A1 * | 4/2024 | Nehlen, III | B01D 29/15 |
| 2024/0226782 A9 * | 7/2024 | Nehlen, III | B01D 29/60 |
| 2024/0318514 A1 * | 9/2024 | John | B01D 29/66 |

* cited by examiner

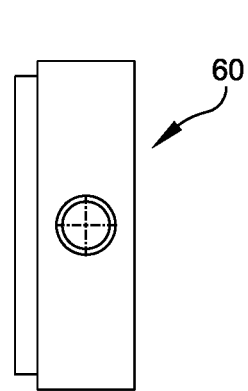
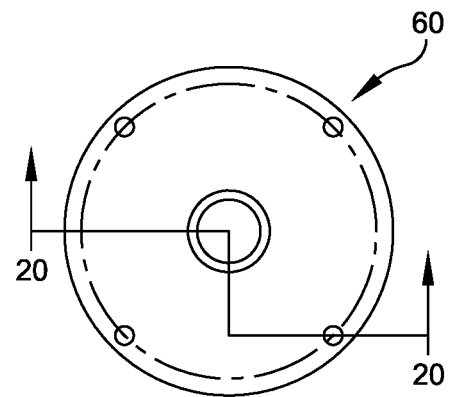
FIG. 18    FIG. 19
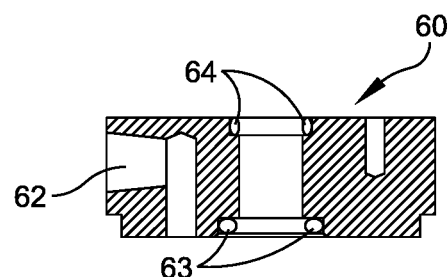
FIG. 20
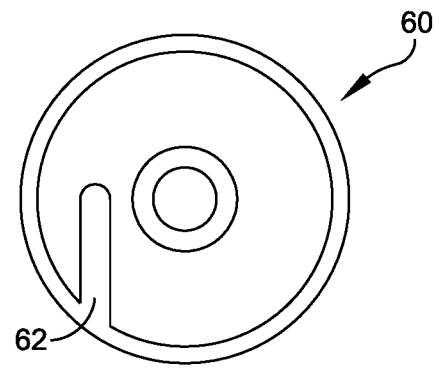
FIG. 21

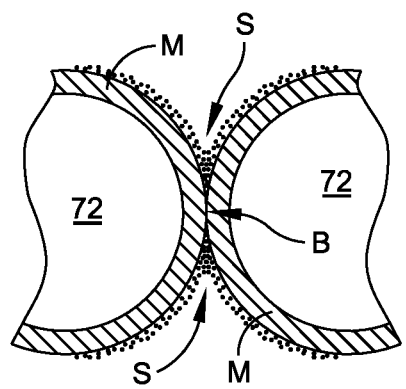
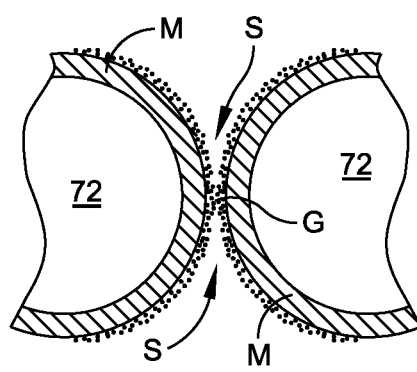
FIG. 29A    FIG. 29B
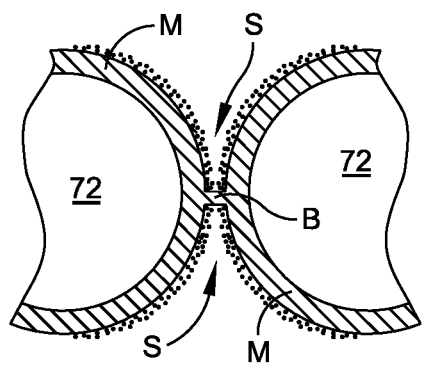
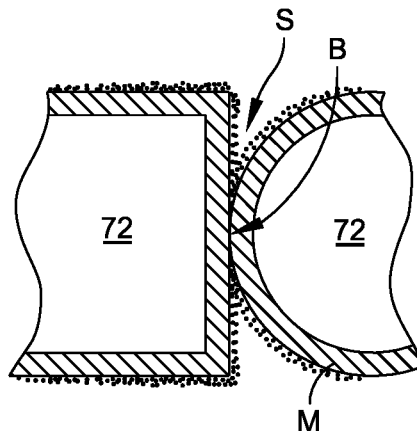
FIG. 29C    FIG. 29D
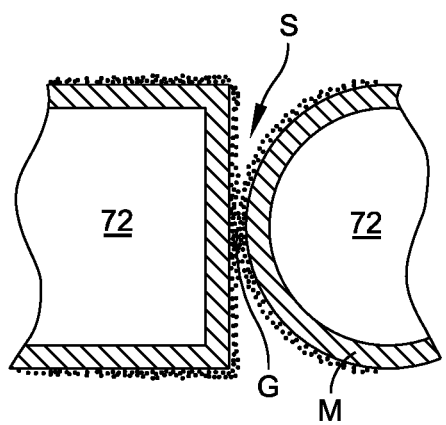
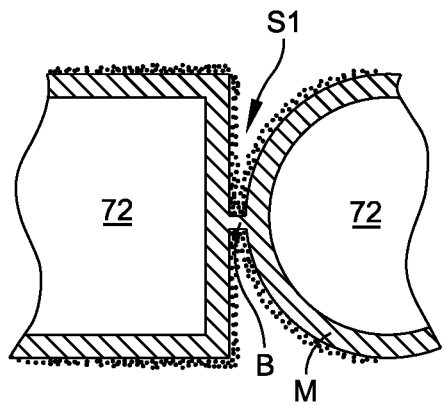
FIG. 29E    FIG. 29F

REGENERATIVE MEDIA FILTRATION

RELATED CASES

Priority for this application is hereby claimed under 35 U.S.C. § 119 (e) to commonly owned and co-pending U.S. Provisional Patent Application Nos. 62/647,006 filed Mar. 23, 2018 and 62/655,468 which was filed on Apr. 10, 2018, and each of which is incorporated by reference herein in its entirety.

FIELD OF THE INVENTION

The present invention relates in general to improvements in subcomponents that form a regenerative media filter; particularly subcomponents within the gas and liquid filtration housing of the regenerative media filter. More particularly, the present invention relates to an improvement and optimization of the construction of interdependent components of the regenerative media filter. Even more particularly the present invention relates to the relative proximity and sizing of individual filter elements or components including the provision, in one embodiment, of a monolithic honeycomb-type filtration structure. The improved structure of the present invention moreover provides optimization of the filtration zone enabling economizations of the various components within the filter, and provides means to remove essentially all of the entrained air from within the filter.

BACKGROUND OF THE INVENTION

In the field of gas and liquid filtration, there is a device known as a regenerative media filter. This particular type of filter typically has a housing for pressure filtration, and employs a grannular or particulate type of filtration media such as, but not limited to, diatomaceous earth or perlite, an amorphous volcanic glass which has the unusual property of greatly expanding when heated sufficiently and providing a massive filtration surface area. In operation the media is deposited on elements which are suspended from a tube sheet. The tube sheet and elements coated with filtration media forms a demarcation or boundary. On the inlet or influent side of the filter the fluid carries particulate contamination which gets filtered out of suspension as the fluid crosses the boundary created by the media covered element. The flow passes through the element, and the tube sheet to the collection plenum and out the filter outlet or effluent connection.

By way of example, refer to U.S. Pat. Nos. 3,715,033; 4,609,462 and 5,128,038 which describe various filter constructions in which the filter tubes are supported by the tube sheet essentially forming a boundary region by which filtration or even heat exchange can be affected. In a typical regenerative media filter, the spacing of the filter elements are at least the width of the filter elements apart. In this regard refer to the prior art diagram in FIG. 1 that is described hereinafter. This geometry balances the filter area against disruptive turbulence transmitted from the filter influent to the filter effluent, traversing the media/element boundary and depositing particulate larger than the media pore size. To prevent turbulence of these independently suspended filter elements, which is extended, inlet and buffer zones are used.

Counterintuitively, and in accordance with an object of the present invention, configuring the filter elements and the volumetric regenerative filter media to achieve consistent coverage of the filter elements is by means of controlled bridging that substantially eliminates the effect of influent turbulence. This is achieved in accordance with the present invention by providing, in one embodiment thereof, a monolithic honeycomb structure that outperforms heretofore known filter element geometries.

Accordingly, it is an object of the present invention to provide an improved filter element configuration that is an improvement over existing filter element constructions in order to reduce turbulence within the filter structure while also reducing in particular the volume and height of the filter housing; including a reduction in the size of the inlet, outlet and buffer zones.

Still another object of the present invention to provide an improved filter element configuration that is an improvement over existing filter element constructions and that can be provided in any one of a number of different embodiment, all of which enable the construction of a smaller filter structure.

SUMMARY OF THE INVENTION

To accomplish the foregoing and other objects, features and advantages of the present invention there is provided an improved regenerative media filter structure and associated method of manufacturing such a regenerative media filter, while solving the above mentioned problems associated with present regenerative media filter constructions. The present invention solves the problem by achieving high fluid flows unaffected by turbulence that plagues the current state-of-the-art of regenerative media filtration.

For the present invention the same end-use regenerative media filter will filter a greater volume of fluid in a substantially reduced volumetric footprint. The economy of filter size translates into the installation in previously height-restricted areas. This height reduction translates to a lower influent and effluent connection height which translates to pump head pressure reduction; thus translating into filtration energy savings presently unachievable due to the additional height of the prior art regenerative media filters.

Concurrent to the fluid filtration improvements are improvements to the mechanical structure of the filter shell, sealing zone subcomponents, and method to articulate the tube sheet in the fluid stream. The problem of entrained air in liquid filtration applications has been solved with a novel flanging arrangement with a clever path engineered to capture entrained air and direct it out of the filter.

Additional improvement was effected by articulating the tube sheet element assembly by means of a self-contained cylinder, that which has a piston attached to a shaft that penetrates the tank through a seal arrangement that is inherently safe in that any leakage from the power side of the cylinder, be it air or hydraulically operated, will leak to atmosphere and not to the process fluid as is the risk of the current state-of-the-art regenerative media filters.

In accordance with the present invention as described herein there is also provided numerous embodiments which are presented as having varying element profiles, lengths, and planar spacing, which when combined with the appropriate regenerative media will maintain the highest levels of regenerative media filtration while minimizing the filter height and/or filter width profile.

In accordance with the present invention there is provided a regenerative filter comprising: a filter housing having inlet and outlet zones; a fluid path provided between the inlet and outlet zones; and a plurality of filter elements each having an outer surface filter media applied thereto and functioning to filter particulate or contaminants from the fluid path. The plurality of filter elements is disposed in an array and includes bridging members or elements that connect between adjacent filter elements, and that forms with the filter elements, a closed interstitial space between adjacent filter elements.

In accordance with other aspects of the present invention the bridging element or member includes at least three bridging elements that form, with three adjacent filter elements, the closed interstitial space; each filter element may be circular in cross-section; the closed interstitial space has three sides as defined by the bridging elements or members; the filter element may be a single layer filter element or a double layer filter element; including a coil spring that is disposed within the filter element, and wherein the array is formed in a honeycomb pattern; and wherein the coil spring comprises a compression spring wound helix that may be pre-compressed to maintain a taught sheath and prevent differential pressure collapse as the filter element becomes loaded with filtrate, and nominally has a wound diameter with staggered or equally spaced larger.

In accordance with the present invention there is also provided a regenerative filter comprising: a filter housing having inlet and outlet zones; a fluid path provided between the inlet and outlet zones; a plurality of filter elements each having an outer surface filter media applied thereto and functioning to filter particulate or contaminants from the fluid path; and a tube sheet that is supported across the filter housing, that is disposed just before the outlet zone and that provides the support for the plurality of filter elements. The plurality of filter elements is disposed in an array and includes bridging elements that couple between adjacent filter elements, and that forms with the filter elements, a closed interstitial space between adjacent filter elements.

In accordance with still other aspects of the present invention the bridging element or member includes a wall member that extends between adjacent filter elements; the bridging element include at least three wall members that form with three adjacent filter elements said closed interstitial space; the plurality of filter elements are constructed and arranged in a honeycomb pattern; the bridging element or member is formed by a contact location between adjacent filter elements; the adjacent filter elements have different geometries.

In accordance with the present invention there is further provided a regenerative filter comprising: a filter housing having inlet and outlet zones; a fluid path provided between the inlet and outlet zones; a plurality of filter elements each having an outer surface filter media applied thereto and functioning to filter particulate or contaminants from the fluid path; and a tube sheet that is supported across the filter housing, that is disposed just before the outlet zone and that provides the support for the plurality of filter elements. The plurality of filter elements are disposed in an array wherein adjacent filter elements are disposed in a monolithic array in which adjacent filter elements are disposed in close relative proximity, but defining a gap therebetween. In accordance with still further aspects of the present invention the adjacent filter elements have different geometries; some of the filter elements are circular and other ones of the filter elements are square; some of the filter elements are circular and other ones of the filter elements are square; the gap between adjacent filter elements is less than a width of the filter element; and wherein there is a maximum tangential geometric proximity of ⅕ the minimum cross-sectional distance across a single filter element, or less.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described heron will become apparent with reference to the following detailed description when taken in conjunction with the accompanying drawings in which:

FIG. 18 is a side view of the cylinder mounting flange;

FIG. 19 is a top view of the cylinder mounting flange of FIG. 18;

FIG. 20 is a cross sectional view of the cylinder mounting flange of FIG. 18 as taken along line 20-20 of FIG. 19;

FIG. 21 is a bottom view of the cylinder mounting flange of FIG. 18;

FIGS. 29A to 29F are a series of schematic diagrams showing alternate arrangements for adjacent filter elements.

PRIOR ART DIAGRAM

Figure 1:
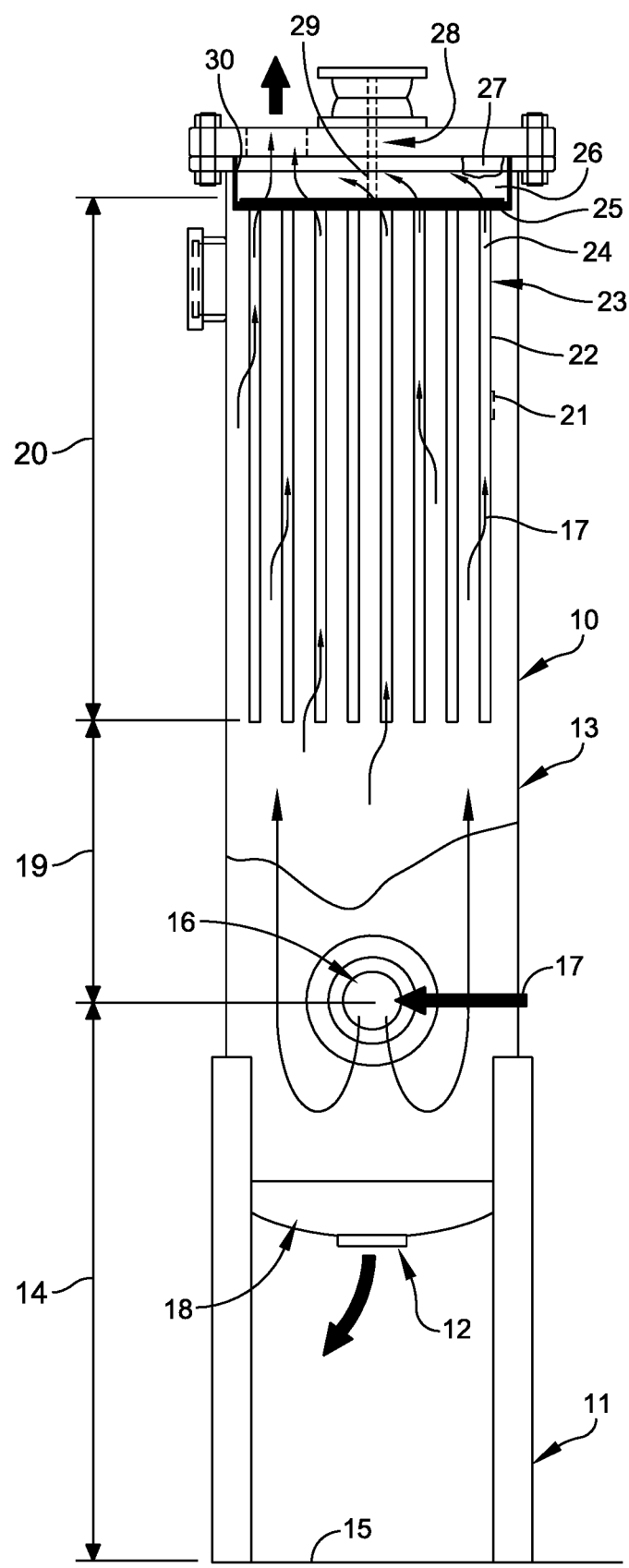
FIG. 1 is a prior art schematic side elevation view of a regenerative media filter showing fluid paths and illustrating the delineated inlet, buffer, filtration, and outlet zones.

Reference is now made to FIG. 1 where there is illustrated a typical regenerative media filter 10. In the prior art construction there is illustrated a housing 13 mounted on legs 11 to facilitate piping the drain 12 connection out of the bottom of the housing 13. This arrangement provides the inlet zone 14 of the filter as measured from the floor 15 to the center of the inlet nozzle 16. Fluid 17 enters the regenerative media filter at the inlet nozzle 16 and is typically turbulent and requiring a deep sump area 18 and buffer zone 19 to transform to a more laminar flow prior to engaging the filtration zone 20 of the regenerative media filter 10.

The aforementioned fluid 17, carrying with it some particulate contamination passes through the cake of regenerative media 21 enveloping each one of the filter element 23 outer surfaces 22. The fluid transitions from the higher pressure inlet side of the filter and passes across the boundary of the filter element sheath 23 to the lower pressure zone 24 of the filter. From the lower pressure side of the filter element 23 it transitions toward the tube sheet 25.

The clean fluid collects in the outlet zone 26 on the way out of the regenerative media filter. It is in the outlet zone 26 where air tends to collect at 27 due to the flat lid geometry of the design. It is also in the outlet zone 26 where prior art regenerative media filters are susceptible to high pressure compressed air leaks due to the nature of the packing gland arrangement 28 that is disposed about the actuation rod 29; penetrating into the housing to move the tube sheet 25 down off of the stop ring 30 which defines the outlet zone 26 inside the housing acting as an outlet flange standoff.

The field of regenerative media filters suffers from inefficient placement of the filtration elements relative to each other. The tank geometry is therefore overly sized and inefficient. Furthermore, this inefficient placement makes the filter susceptible to turbulence, which negatively affects the filtration efficiency.

Detailed Description of Alternate Embodiments of the Invention

Figure 2:
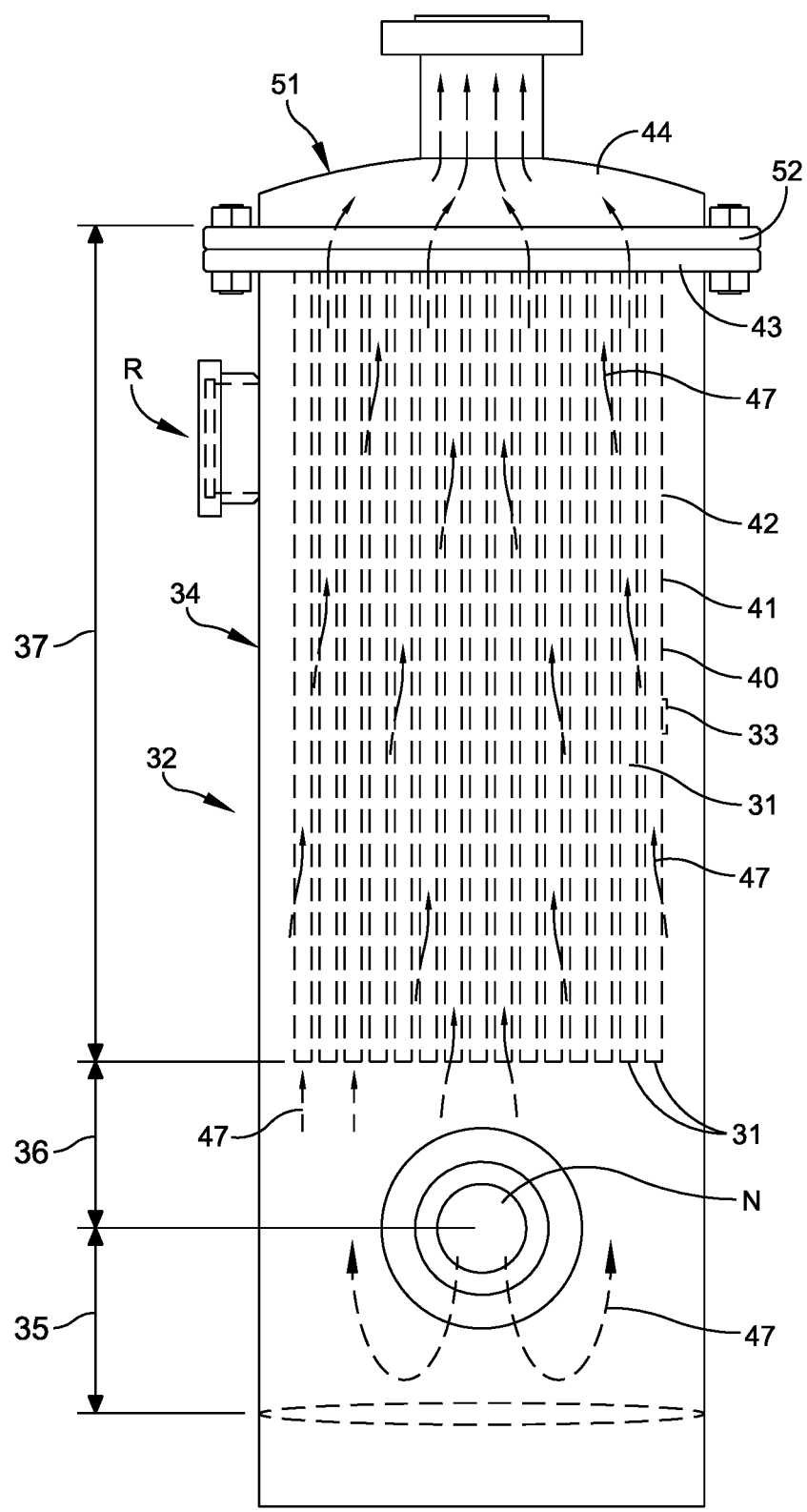
FIG. 2 is a schematic side elevation view of one embodiment of the regenerative media filter of the present invention showing fluid paths and illustrating the delineated inlet, buffer, filtration, and outlet zones.

In accordance with the present invention the regenerative media filter is constructed to optimize the overall size of the filter per unit of fluid filtered and achieves this by optimizing multiple variables simultaneously, Refer in particular to FIG. 2 that illustrates a regenerative media filter in accordance with the present invention indicated generally at 32. These variables include, among possible other variables, the diameter of the filter elements 31; the planar spacing of the elements 31; the volume of regenerative media 33 that is deposited on the outer surface 40 of the filter elements 31; the resultant interstitial free space S (refer, for example, to the embodiment shown in FIG. 25) when the filter elements 31 are coated with the filtration media 33; the shell diameter of the filter housing 34; the height and volume of the inlet zone 35; the height and volume of the buffer zone 36; and the height and volume of the filtration zone 37 of the regenerative media filter. As in accordance with the present invention, by comparing FIGS. 1 and 2 it can be seen that the inlet and buffer zones in the embodiment of the present invention as illustrated in FIG. 2 is significantly smaller than the like zones illustrated in FIG. 1. With further reference to FIG. 2, a path is shown for fluid flow depicted at 47. Fluid path 47 enters the regenerative media filter at the inlet nozzle N and is directed into a wide and relatively shallow inlet zone area 35 and relatively shallow buffer zone 36 to thereafter transform into a more laminar flow prior to engaging the filtration zone 37 of the regenerative media filter 34.

Figure 22:
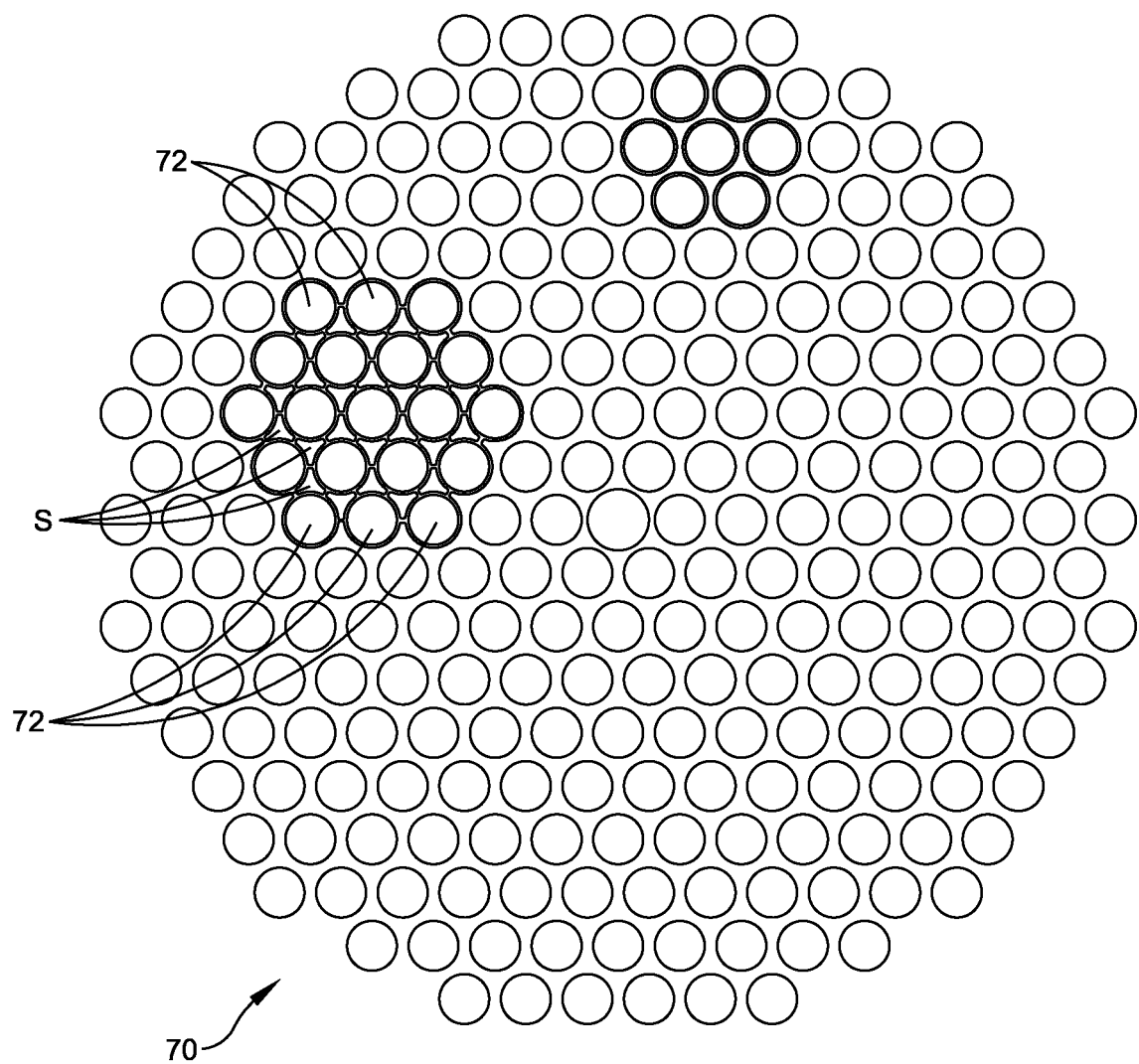
FIG. 22 is a bottom view of the element bundle.
Figure 25:
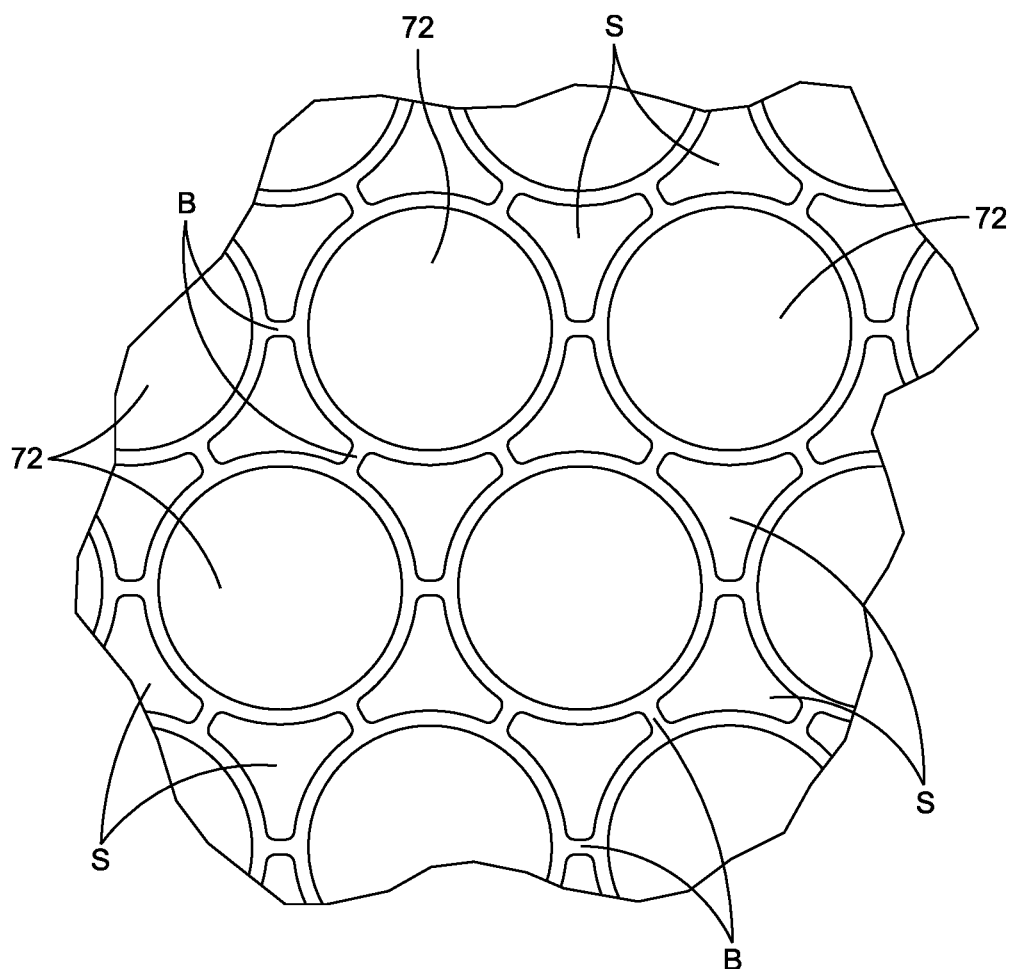
FIG. 25 is a fragmentary and enlarged cross sectional view showing in greater detail a portion of the filter element array as taken from a portion of FIG. 22.
Figure 25A:
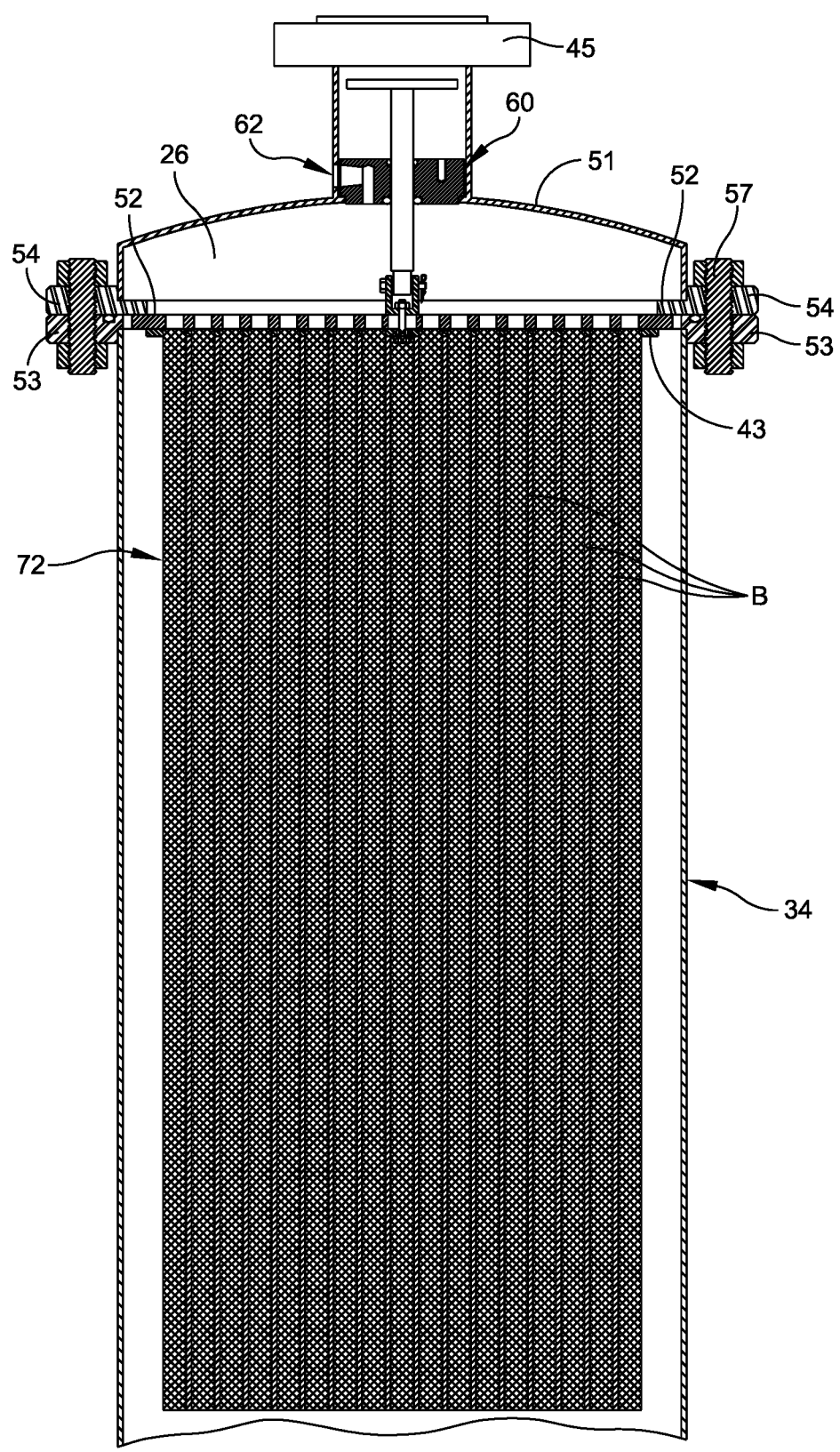
FIG. 25A is a sectional view similar to that illustrated in FIG. 3A but additionally including the bridging between filter elements.
Figure 25B:
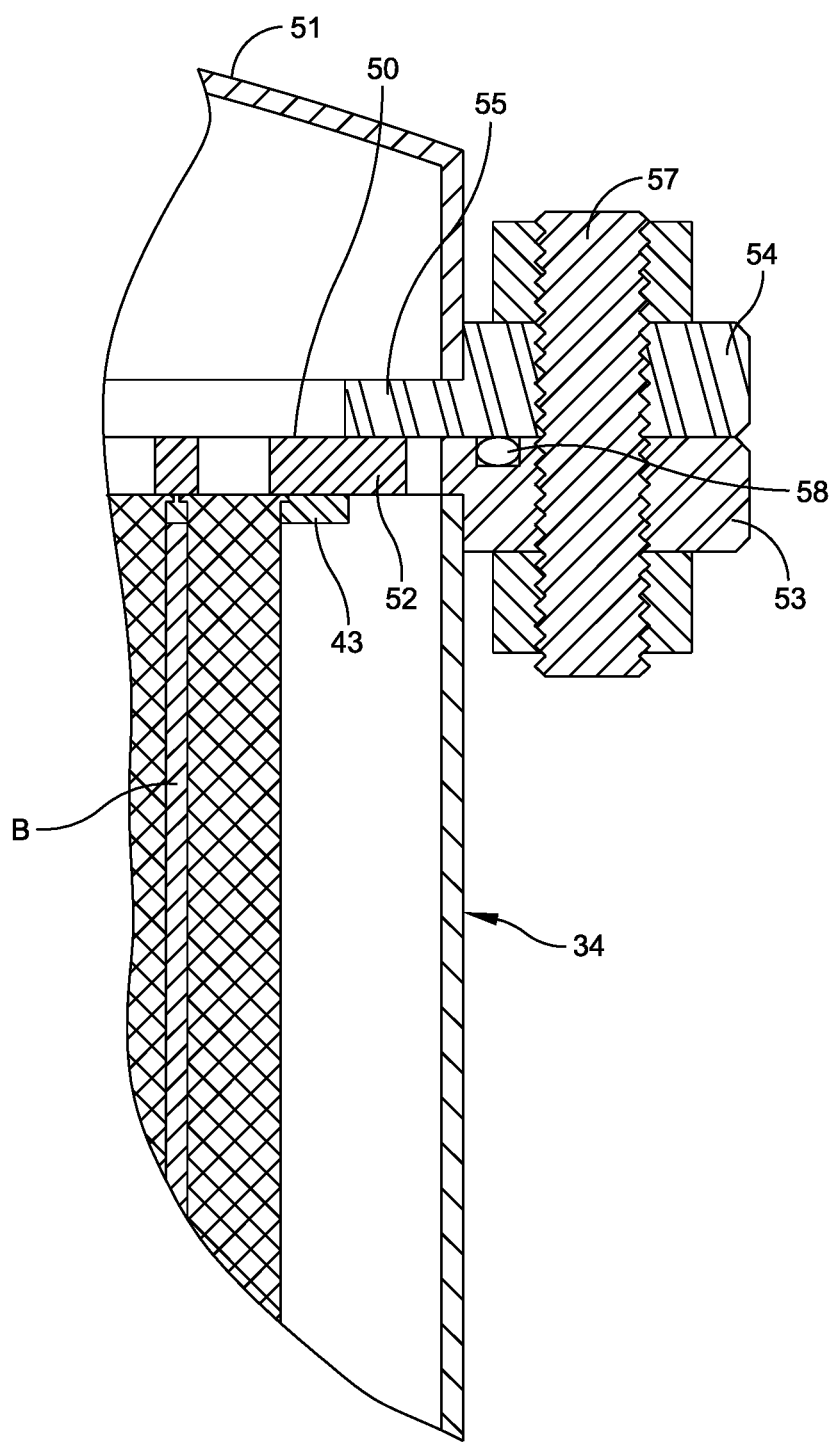
FIG. 25B is an enlarged fragmentary view pertaining to FIG. 25A.

The aforementioned fluid path 47 carries with it some particulate contamination that passes through a resultant filtration structure made up of individual filtration elements 31 arranged within a containment vessel such that when the particulate filtration media 33 uniformly coats the filtration elements 31, via flow and Bernoulli's Principle, the individual filter elements form a unified filtration structure of the form of a highly efficient honeycomb type structure, such as shown, by way of example, in FIGS. 22 and 25. The honeycomb type filter array with interstitial free spaces S provides the geometric optimization previously described. This fluid path 47 passes through the cake of regenerative media 33 enveloping each one of the filter elements outer surfaces 40 from the higher pressure inlet side of the filter and passing across the boundary of the element sheath 41 of each filter element 31 to the lower pressure zone 42 of the filter and makes its way towards the tube sheet 43.

The cleaned fluid collects in the outlet zone 44 on the way out of the regenerative media filter. It is in the outlet zone where all entrained air is captured and exhausted out through a port at the highest point of the dome 51. It is also in the outlet zone 44 where prior art regenerative media filters are susceptible to high pressure compressed air leaks, but due to the novel construction of the present invention the fluid is effectively discharged. In this regard refer to FIG. 3 that shows an exploded view of the regenerative media filter of FIG. 2 illustrating such components as the filter shell or housing, the filter elements, the outlet plenum and the media revival cylinder mounted on an innovative flange mechanism 60. This flange mechanism seals the tank from the compressed air actuation cylinder 45 simultaneously facilitating the actuation rod 46 penetration into the housing to articulate the tube sheet 43 down off of the sealing surface 50 which defines the outlet zone inside the housing acting as a demarcation surface.

Figure 3:
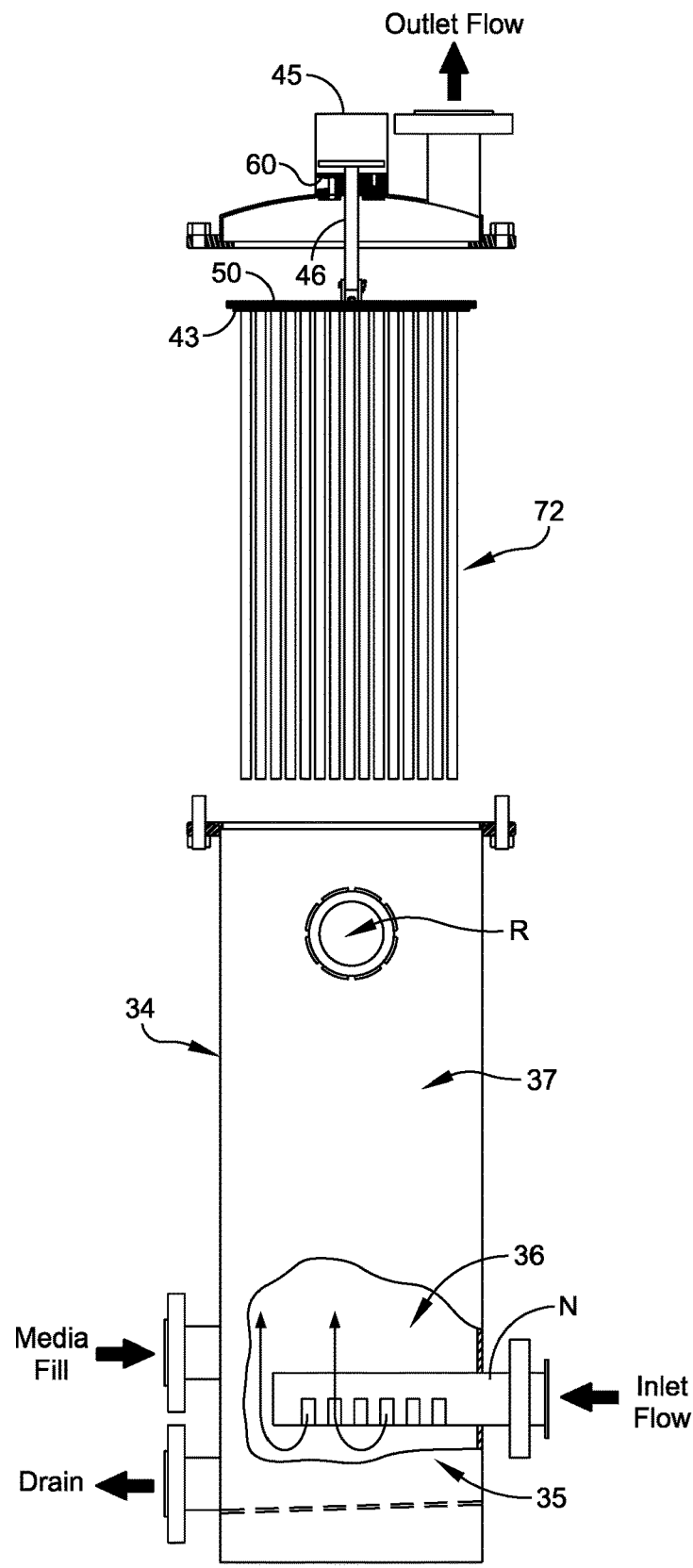
FIG. 3 is an exploded view of the regenerative media filter of FIG. 1 illustrating such components as the filter shell or housing, the filter elements, the outlet plenum and the media revival cylinder mounted on an innovative top flange.
Figure 4:
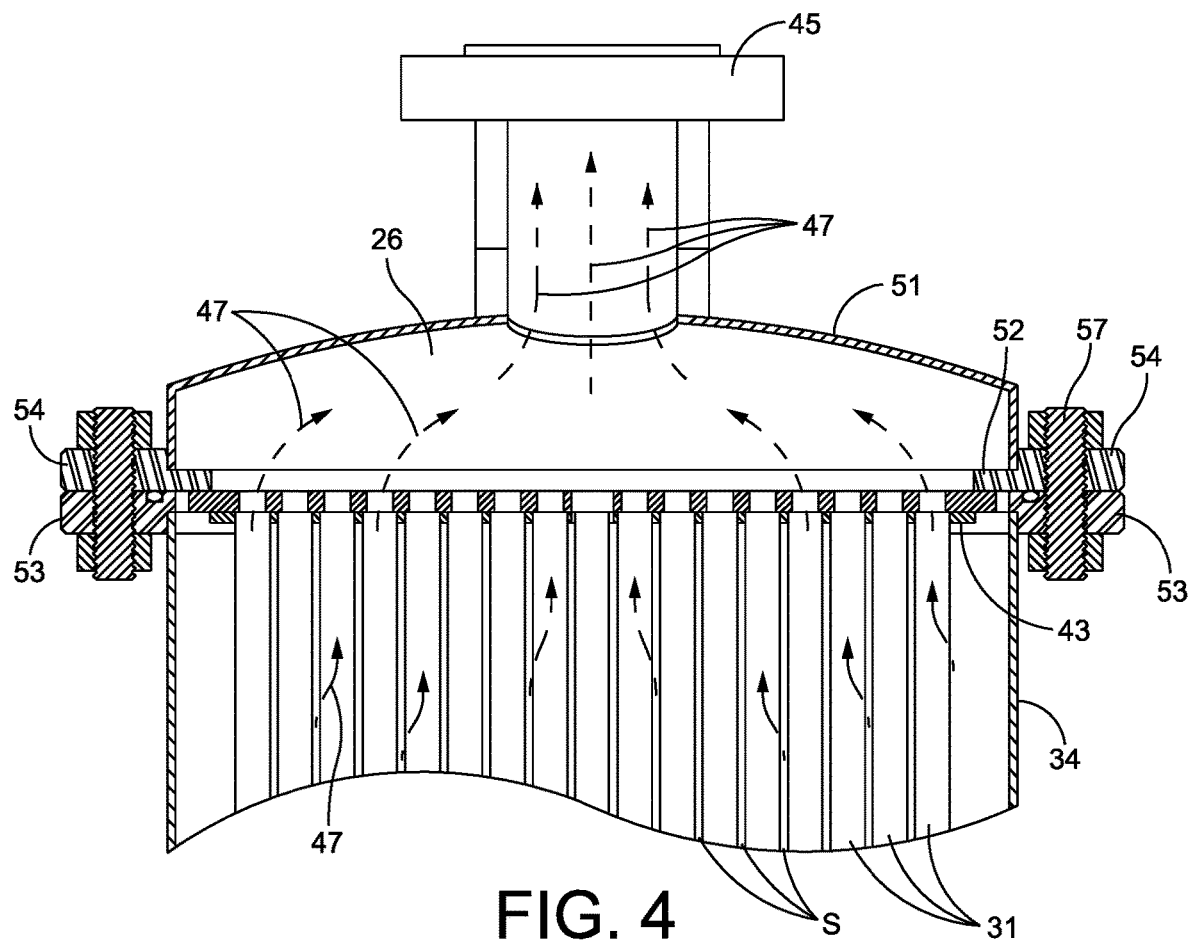
FIG. 4 is a fragmentary cross sectional view of the tube sheet hold down plate seated against the upper flange cantilevered sealing surface, demonstrating flow from the influent side of the filter through the elements, across the tube sheet, into the filter effluent plenum and out through the filter effluent connection.
Figure 5:
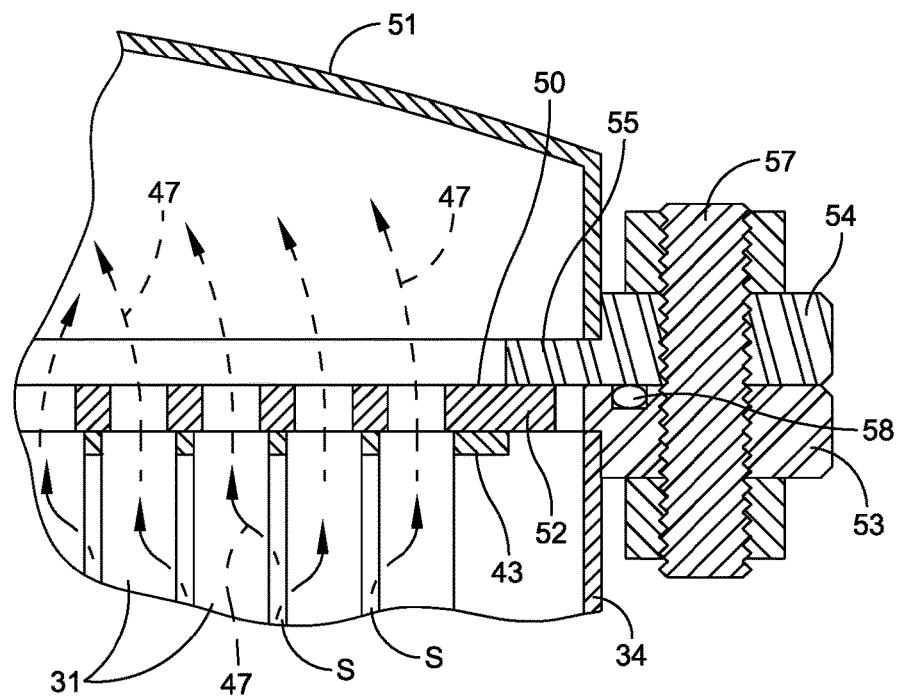
FIG. 5 is an enlarged fragmentary cross sectional view of the tube sheet hold down plate seated against the upper flange cantilevered sealing surface, while delineating between filter elements and interstitial spaces between them.

FIG. 3 is an exploded view of the regenerative media filter of FIG. 1 illustrating such components as the filter shell or housing, the filter elements, the outlet plenum and the media revival cylinder mounted on an innovative top flange. FIG. 4 is a fragmentary cross sectional view of the tube sheet hold down plate seated against the upper flange cantilevered sealing surface, demonstrating flow from the influent side of the filter through the elements, across the tube sheet, into the filter effluent plenum and out through the filter effluent connection. FIG. 5 is an enlarged fragmentary cross sectional view of the tube sheet hold down plate 52 seated against the upper flange cantilevered sealing surface 59, while delineating between filter elements and interstitial spaces between them.

In the exploded view of FIG. 3 there is shown the housing 34 and the inlet flow at N. At the inlet zone 35 the fluid to be filtered enters and passes through the buffer zone 36 to the filtration zone 37. A sight glass or port R may be provided at the housing 34 as depicted in FIGS. 2 and 3. In FIG. 3 the filter element bundle or array is articulated by the cylinder 45 and actuation rod 46 with an up and down action that sheds the filter media 33 from the individual filter elements of the filter array. Refer also to more detail provided in FIGS. 4 and 5 of the overall construction. The components further include a tube sheet 43 that is the main planar support for all of the filter elements 31, a hold down plate 52 for holding the tube sheet in place, a lower tank flange 53, and an upper tank flange 54.

In FIG. 3 the filter element bundle or array is articulated by the cylinder 45 in an up and down direction to shed the filter media that is deposited about the filter elements. FIG. 3 also shows the seal and hold down plate where a sealing surface 50 is provided between the hold down plate and the upper tank flange. This sealing structure delineates between the clean plenum area and the dirty inlet/buffer/filtration zones. FIG. 3 also illustrates the inflow by arrow B and the outflow by arrow A. The flanging arrangement is open at one end to receive the contaminated influent, hermetically welded to the filter shelf with perforations along the access of the tube designed to direct the contaminated influent in such a way as to minimize the volumetric dimensions of the inlet zone 35 and the buffer zone 36 to eliminate turbulence reaching the filtration zone 37. Regarding FIG. 3, it is noted that there is a height above the left wall of the outlet tube that would trap air if one were to fill this filter with water from the bottom to the top. However, the innovative cylinder mounting flange sits at the apex of the filter, and the machined groove on the lower left quadrant of FIG. 21, leading to the machined outlet as viewed on the left half of the sectional view of FIG. 20, allows the trapped air to escape. This same connection facilitates evacuation of the filter for the purpose of replenishing the filter media (media notation of FIG. 3).

Figure 3A:
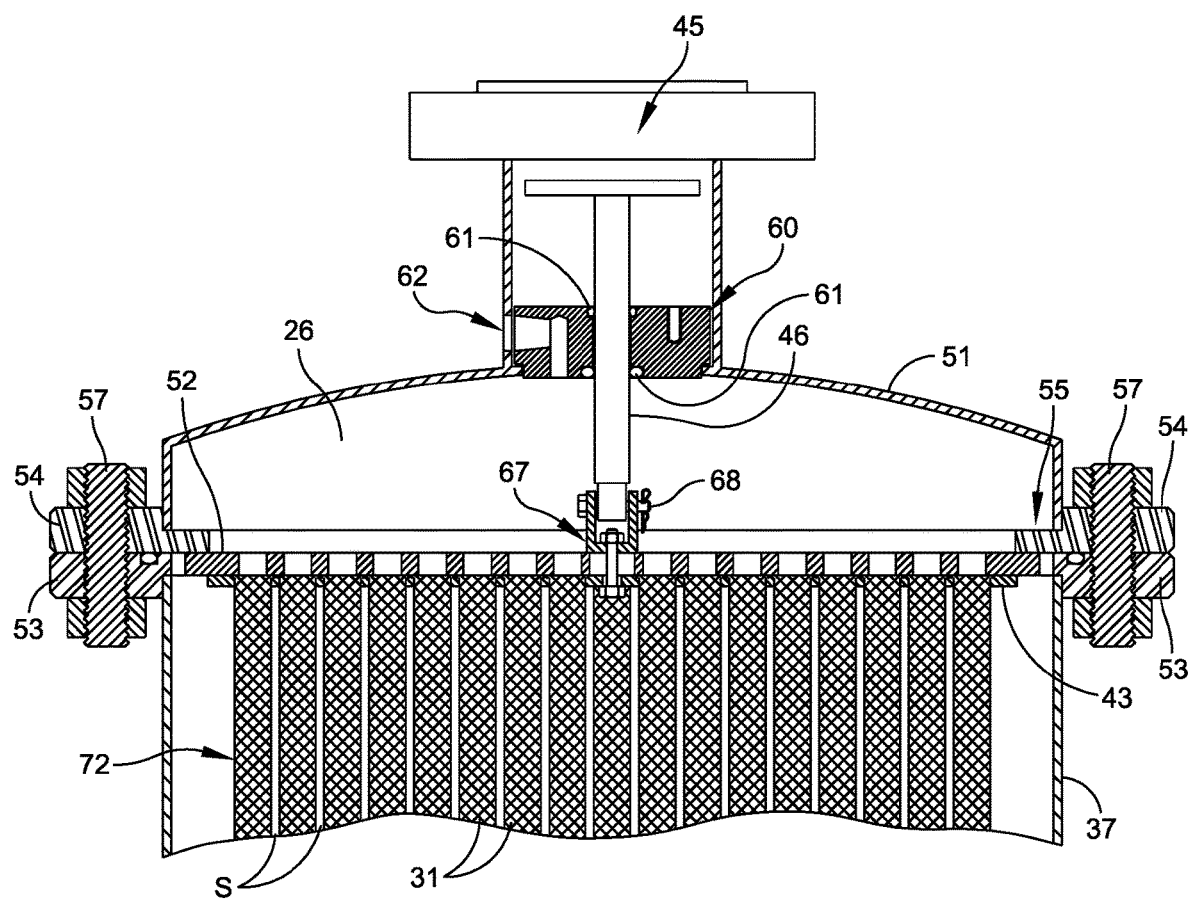
FIG. 3A is a cross-sectional view similar to that depicted in FIG. 4 and illustrating the bundle in position with the hold down plate being urged into contact with the cantilever section of the upper tank flange.
Figure 3B:
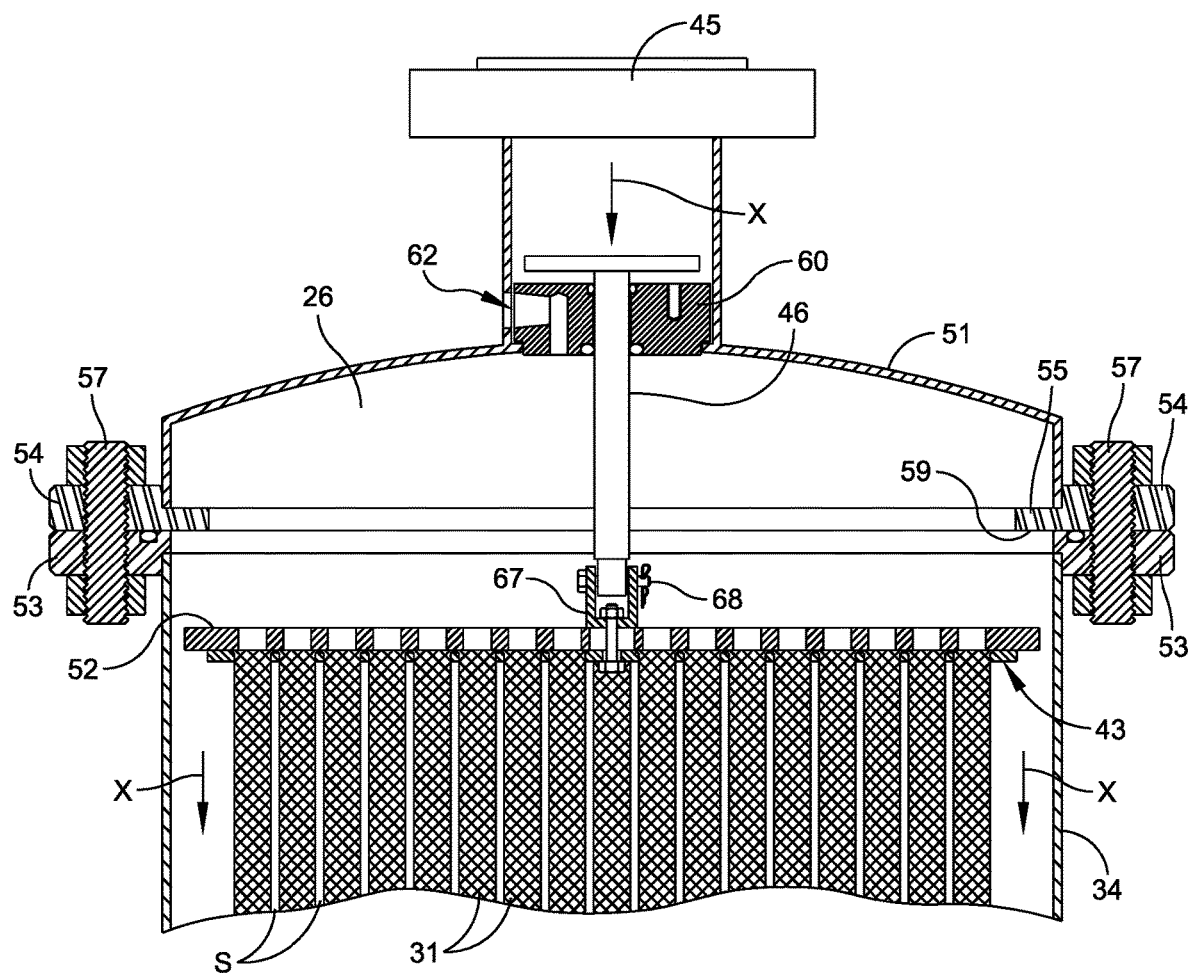
FIG. 3B is a cross-sectional view of the entire bundle being moved downwardly in the direction of arrow X.
Figure 3C:
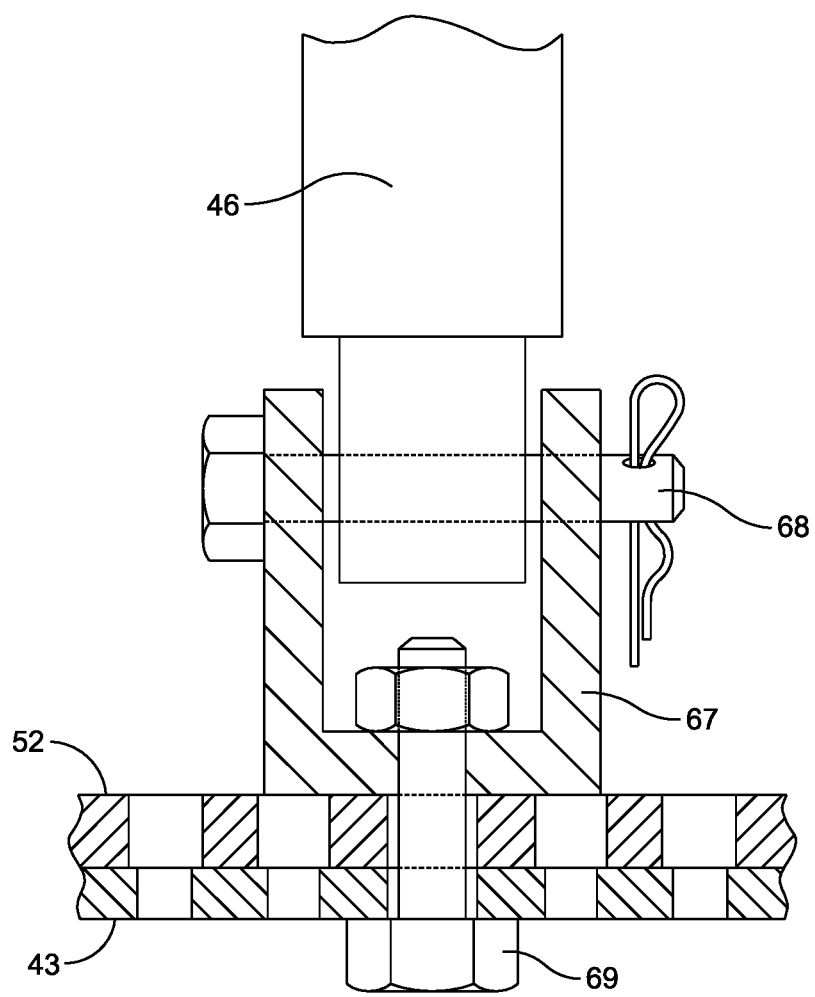
FIG. 3C is a more detailed view showing the connection between the actuation rod and the hold down plate.

Reference is now made to FIGS. 3A to 3C. FIG. 3A is a cross-sectional view similar to that depicted in FIG. 4 and illustrating the bundle 72 in position wherein the hold down plate 52 is urged into contact with the cantilever section 55 of the upper tank flange 54. FIG. 3A also shows the connection of the actuation rod 46 which is controlled from the cylinder 45. The actuation rod 46 is supported by the flange mechanism 60 that is described in FIGS. 18-21. In FIG. 3A the rod 46 supports the hold down plate 52 by means of the U-shaped bracket 67. The end of the rod 46 connects to the bracket 67 by means of a pin 68 and associated cotter pin. As illustrated in FIG. 3C, a bolt 69 is also used for securing the bracket 67 with the hold down plate 52. Other securing mechanisms and fasteners may be used as long as the rod 46 is secured with the hold down plate. In this way, the actuation of the rod 46 can transition the filter element bundle 72 between the position shown in FIG. 3A and the position shown in FIG. 3B.

With regard to the flange mechanism 60, reference is also made hereinafter to FIG. 21A. This flange mechanism 60 supports the actuation rod 46 and also provides an escape path by way of the port 62 so that entrained air within the dome 51 can escape from the housing. In FIG. 3A the rod 46 is shown in a more proximal position whereby the sealing surface 50 of the hold down plate 52 is urged against the cantilever 55 of the upper tank flange 54. When it is desired to clean the filter, the entire bundle is moved downwardly in the direction of arrow X in FIG. 3B. FIG. 3B thus shows the actuator rod 46 in a more distal position with the sealing surface 50 of the hold down plate 52 now separated from the surface 59 of the cantilever section 55 of the upper tank flange 54.

Figure 3D:
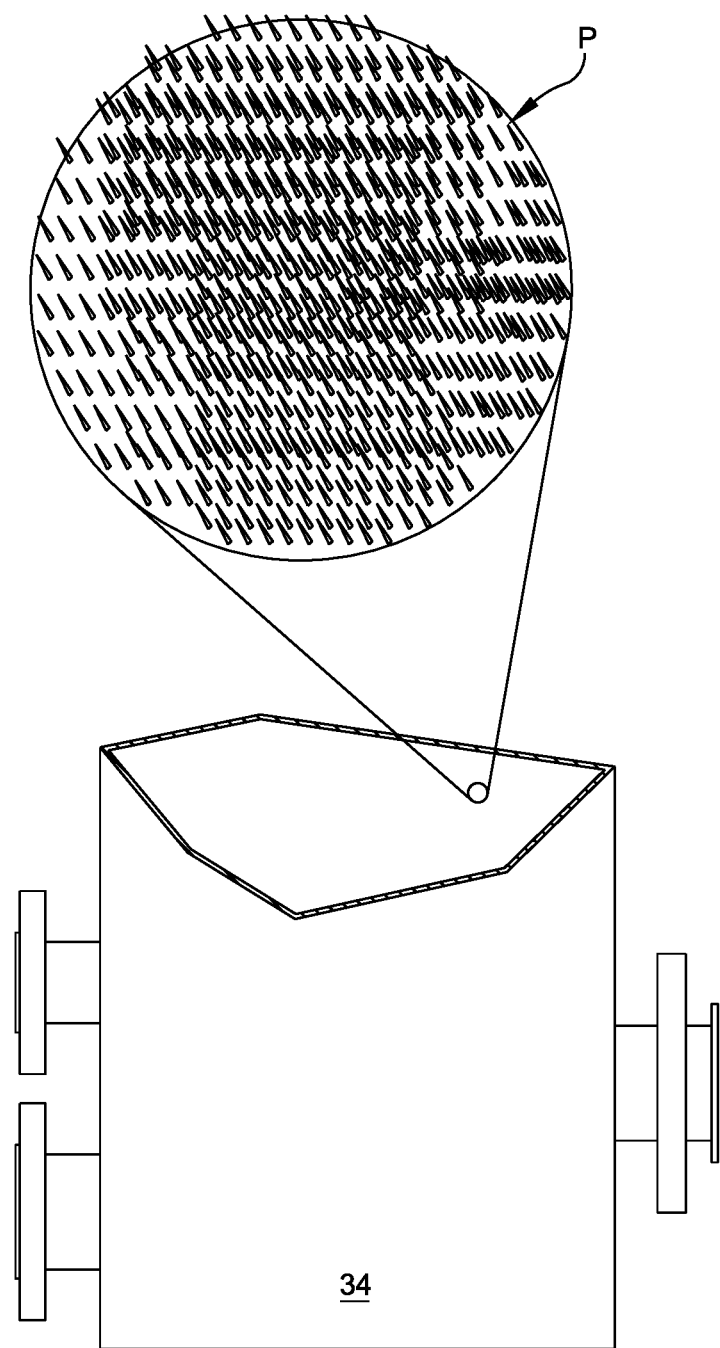
FIG. 3D relates to the concept of affixing a nanoscale barrier to an interior surfaces of the regenerative media filter.

One aspect of the present invention with regard to the diagram illustrated in FIG. 3D. This relates to affixing a nanoscale barrier P to the interior surfaces of the regenerative media filter and housing. This nanoscale barrier P may be applied by spraying or other technique. For illustrative purposes, we have shown the interior of the shell wall in FIG. 3D. However, that nanoscale barrier might be applied to all surfaces, including that of the regenerative media itself, providing a mechanism to disrupt the cell wall of microscopic viruses and organisms that would otherwise grow and breed in the influent side of the filter. This nanoscale barrier P serves to reduce the load of chemicals and UV power levels so as to achieve safe biological control within the water system while providing a substantial reduction in cost.

Regarding the cross-sectional views of FIGS. 4 and 5 there is illustrated the housing 34. The top edge of the housing 34 is supported at the lower tank flange 53. An O-ring 58 is preferably provided between the upper and lower tank flanges 53 and 54. A bolt 57 or the like is used for securing the upper and lower tank flanges together in a sealed relative manner.

Figure 5A:
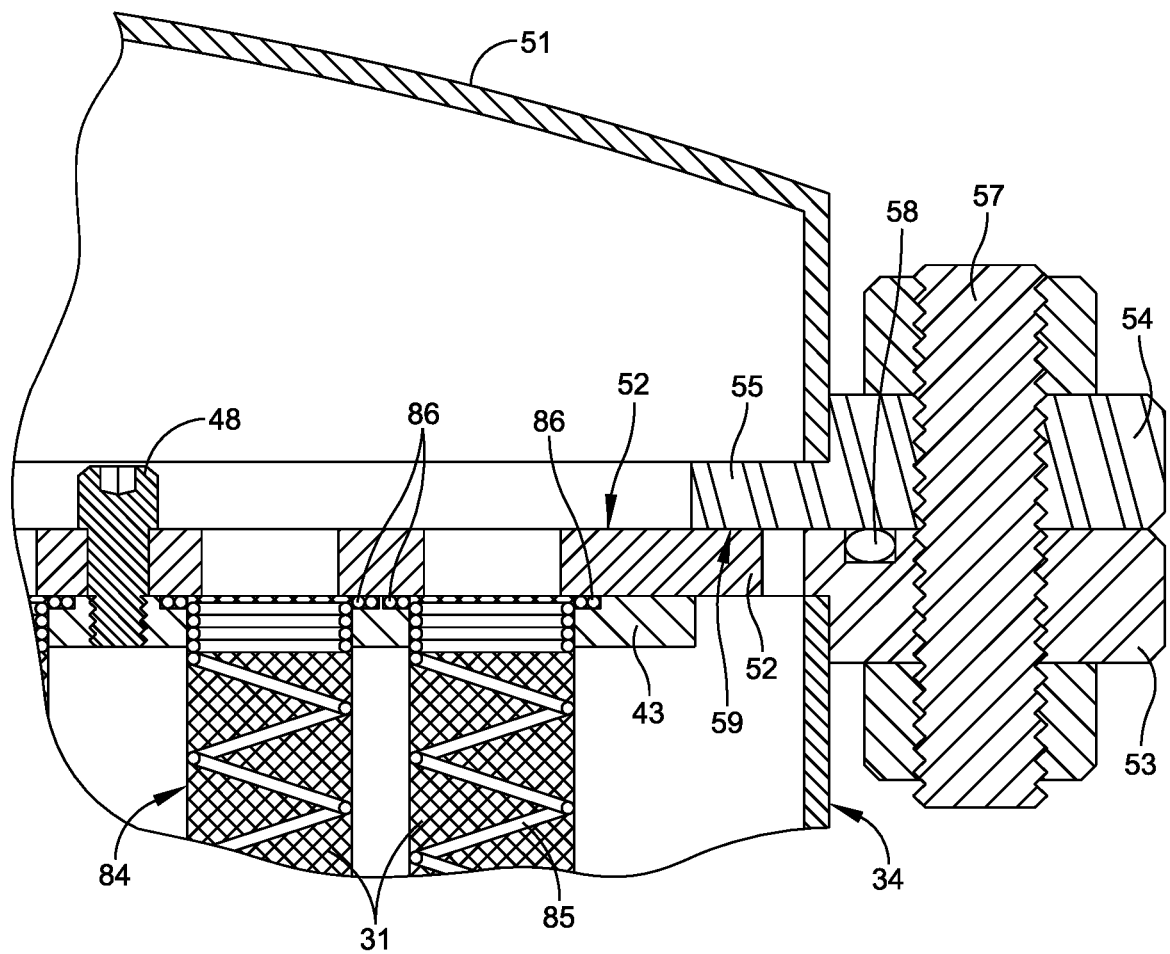
FIG. 5A is a cross-sectional view like that shown in FIG. 5 but illustrating a different version of the tube sheet construction.
Figure 10:
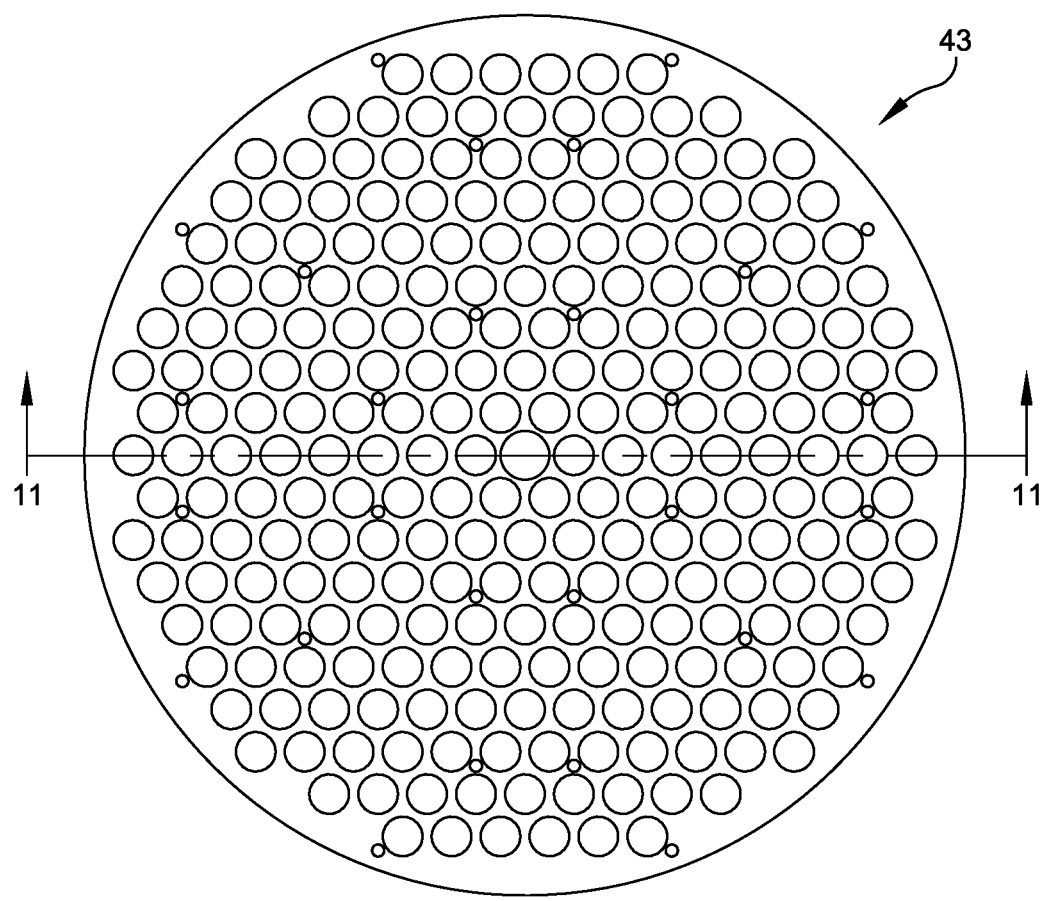
FIG. 10 is a top view of the tube sheet plate.
Figure 12:
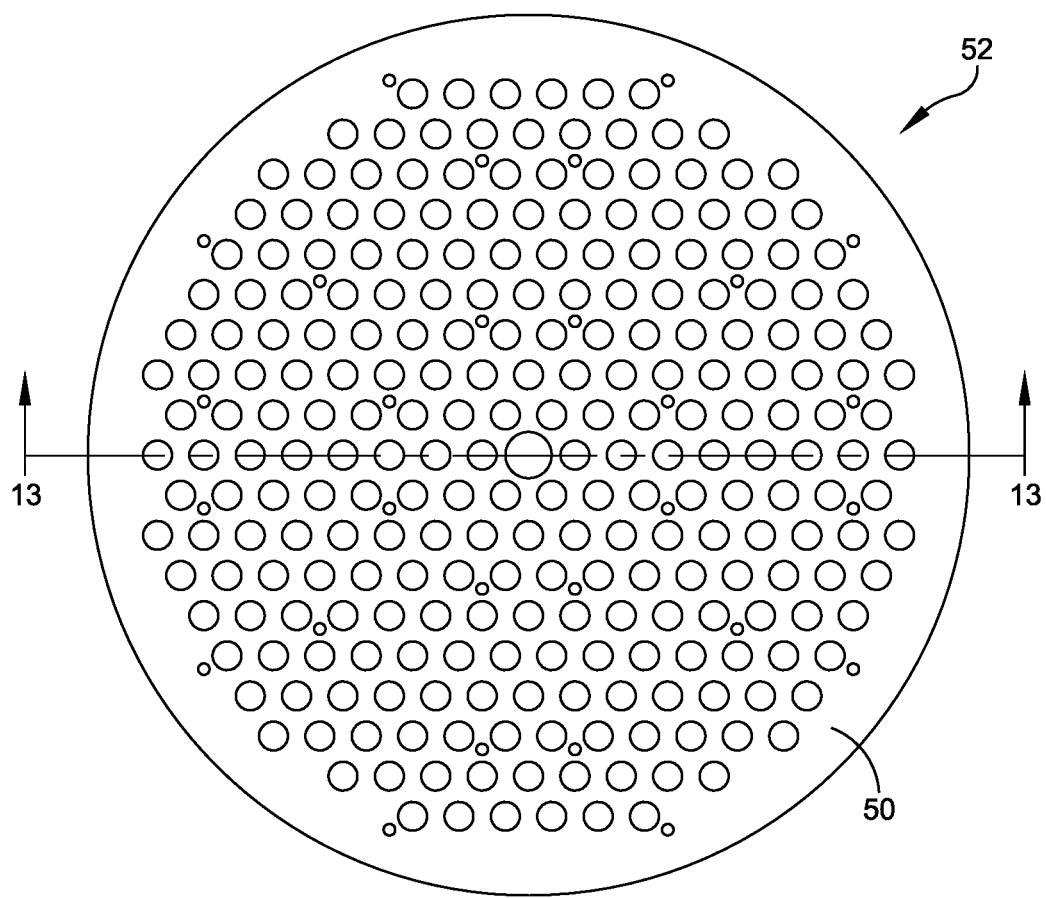
FIG. 12 is a top view of the hold down plate.

FIG. 5A illustrates a portion of the tube sheet 43 and the hold down plate 52. FIG. 5A also illustrates a cap screw 48 that may be used for securing together the tube sheet plate 43 and the hold down plate 52. FIGS. 10 and 12 illustrate, by smaller diameter circles, the placements of possible cap screws for securing the plates 43 and 52 together. FIG. 5A also illustrates one embodiment of the filter element as will be described in more detail in FIG. 24. The filter element is shown as including an outer sheath 84 and a spring 85 that supports the overall contour of the sheath. At the top of the sheath 84 there is provided a flange 86. Once again, refer to FIG. 24 for an illustration of the flange 86. The flange 86 is captured between the hold down plate 52 and the tube sheet plate 43. FIG. 5A also illustrates the top edge of the housing 34 as engaged with the lower tank flange 53.

Figure 6:
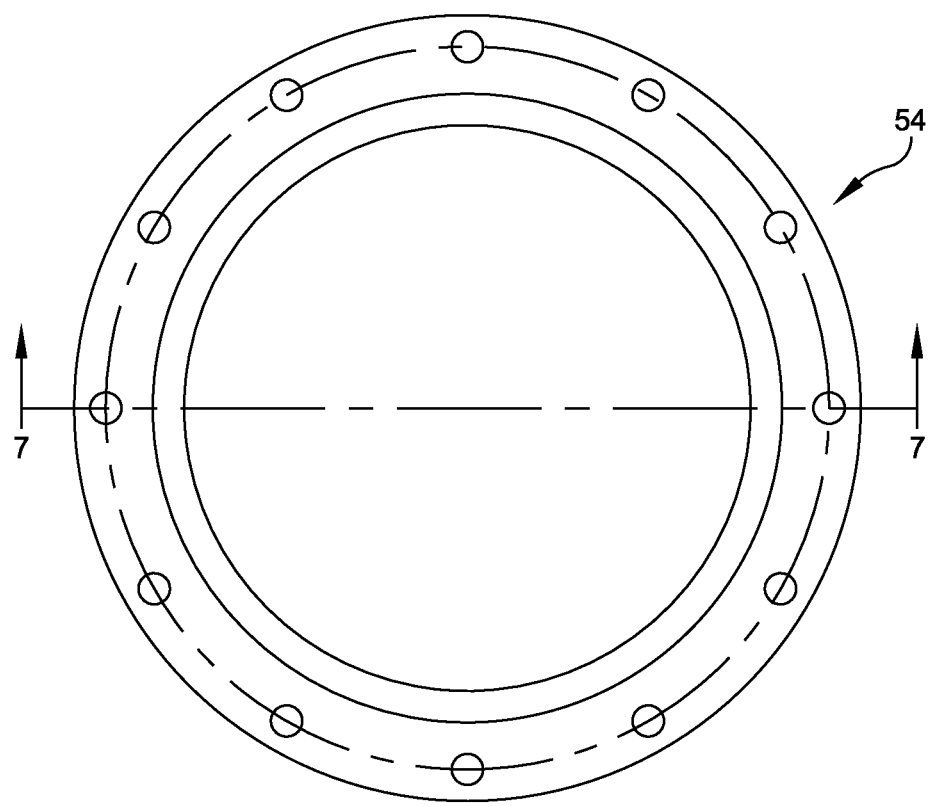
FIG. 6 is a top view of the upper tank flange/articulated bundle sealing surface.
Figure 7:
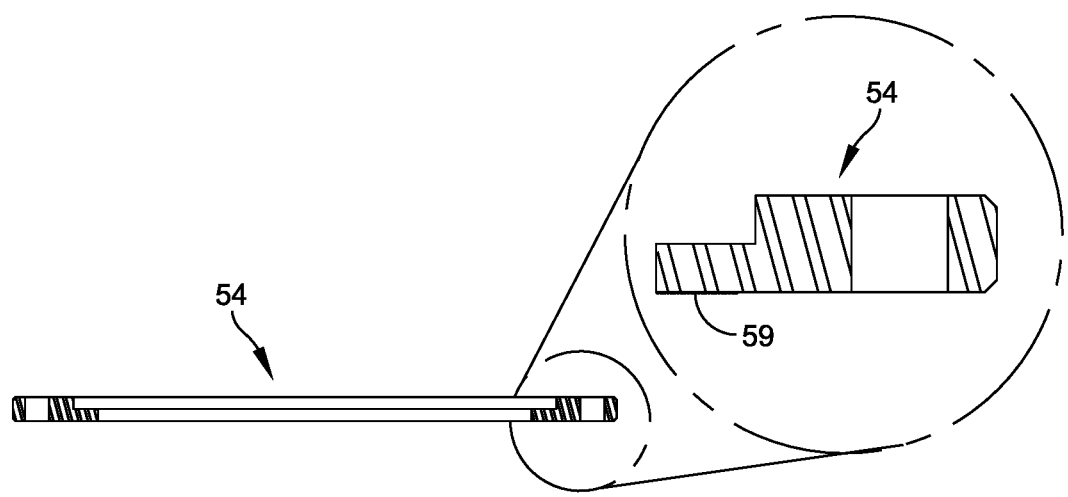
FIG. 7 is an enlarged cross sectional view of the sealing surface of the upper tank flange/articulated bundle sealing surface of FIG. 6 as taken along line 7-7 of FIG. 6.
Figure 8:
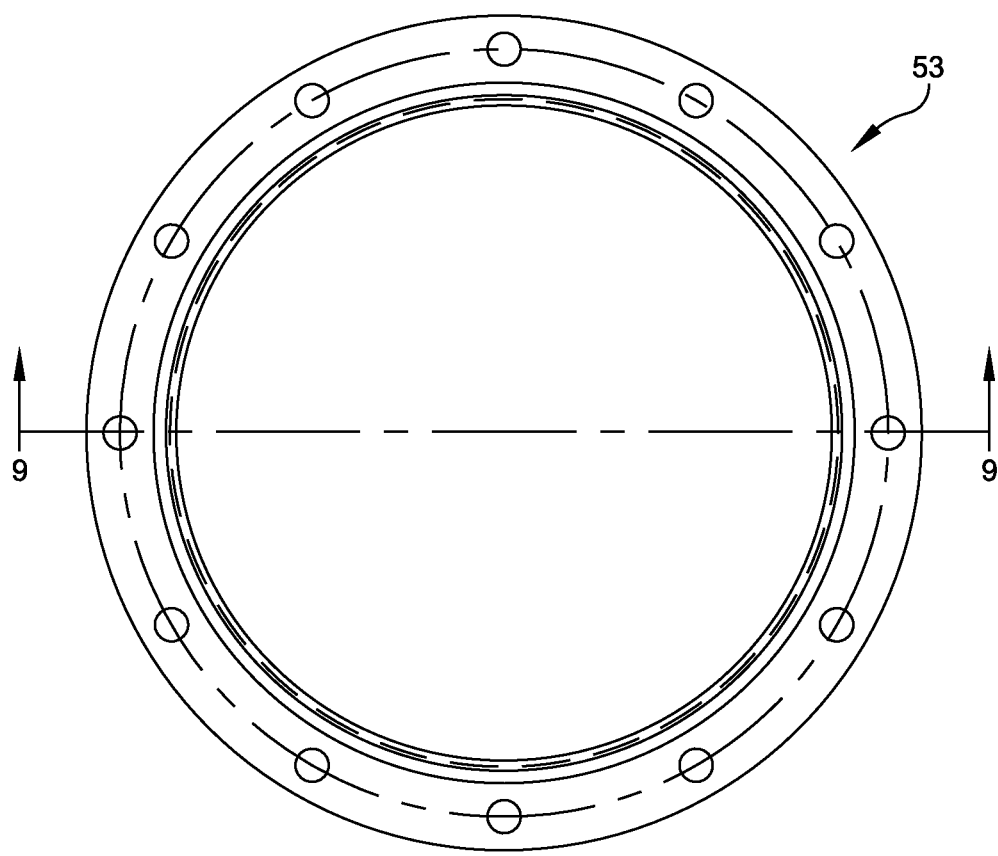
FIG. 8 is a top view of the lower tank flange/articulated bundle sealing stabilization surface.
Figure 9:
FIG. 9 is a cross sectional view of the lower tank flange/articulated bundle sealing stabilization surface of FIG. 8 as taken along line 9-9 of FIG. 8.
Figure 11:
FIG. 11 is a cross sectional view of the tube sheet plate of FIG. 10 as taken along line 11-11 of FIG. 10.
Figure 13:
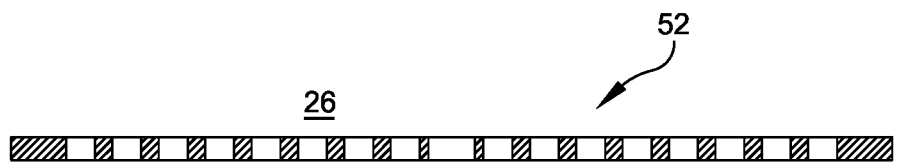
FIG. 13 is a cross sectional view of the hold down plate of FIG. 12 taken along line 13-13 of FIG. 12.
Figure 14:
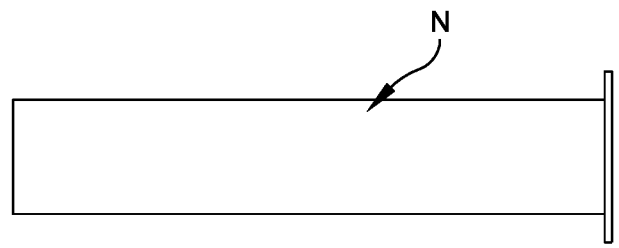
FIG. 14 is a top view of the inlet tube.

FIG. 6 is a top view of the upper tank flange/articulated bundle sealing surface. FIG. 7 is an enlarged cross sectional view of the sealing surface of the upper tank flange/articulated bundle sealing surface of FIG. 6. FIG. 8 is a top view of the lower tank flange/articulated bundle sealing stabilization surface. FIG. 9 is a cross sectional view of the lower tank flange/articulated bundle sealing stabilization surface of FIG. 8. FIG. 10 is a top view of the tube sheet plate. FIG. 11 is a cross sectional view of the tube sheet plate of FIG. 10. FIG. 12 is a top view of the hold down plate. FIG. 13 is a cross sectional view of the hold down plate of FIG. 12. The hold down plate is arranged to maintain all the filter elements in a fixed relative position. The hold down plate also functions as an inverted tube sheet in that fluid that passes through its holes is clean as it passes through the filter media.

Figure 15:
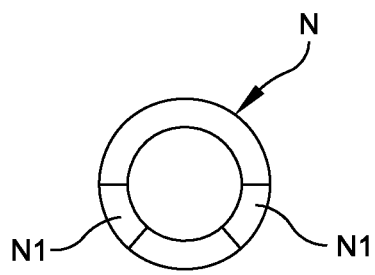
FIG. 15 is a front view of the inlet tube of FIG. 14 cut away to show the slots.
Figure 16:
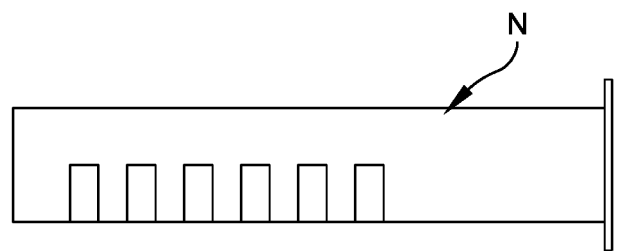
FIG. 16 is a side view of the inlet tube of FIG. 14.
Figure 17:
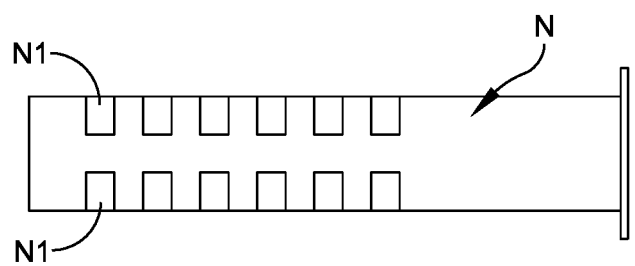
FIG. 17 is a bottom view of the inlet tube of FIG. 14.
Figure 17A:
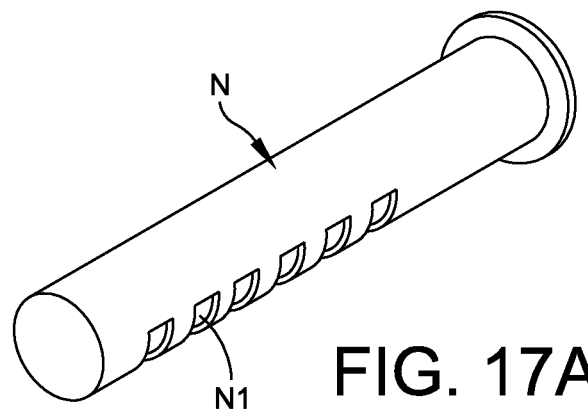
FIG. 17A is a perspective view of the inlet tube of FIG. 14.

Reference is now made to the inlet nozzle construction in accordance with the present invention. FIGS. 14-17A illustrate the inlet tube or nozzle N that is configured to direct flow away from the filter element bundle thus assisting in maintaining the proper flow and controlled turbulence. For this purpose, the nozzle N is provided with a series of slots N1 that are spaced apart and that are disposed along a bottom circumference. These are depicted in the view of FIG. 15 as well as in the side view of FIG. 16 and the bottom view of FIG. 17. Each of these slots extend about a minor radius and on the bottom are separated by a wall. In this way, the inward flow is directed somewhat sideways but from opposite sides of the nozzle.

Figure 21A:
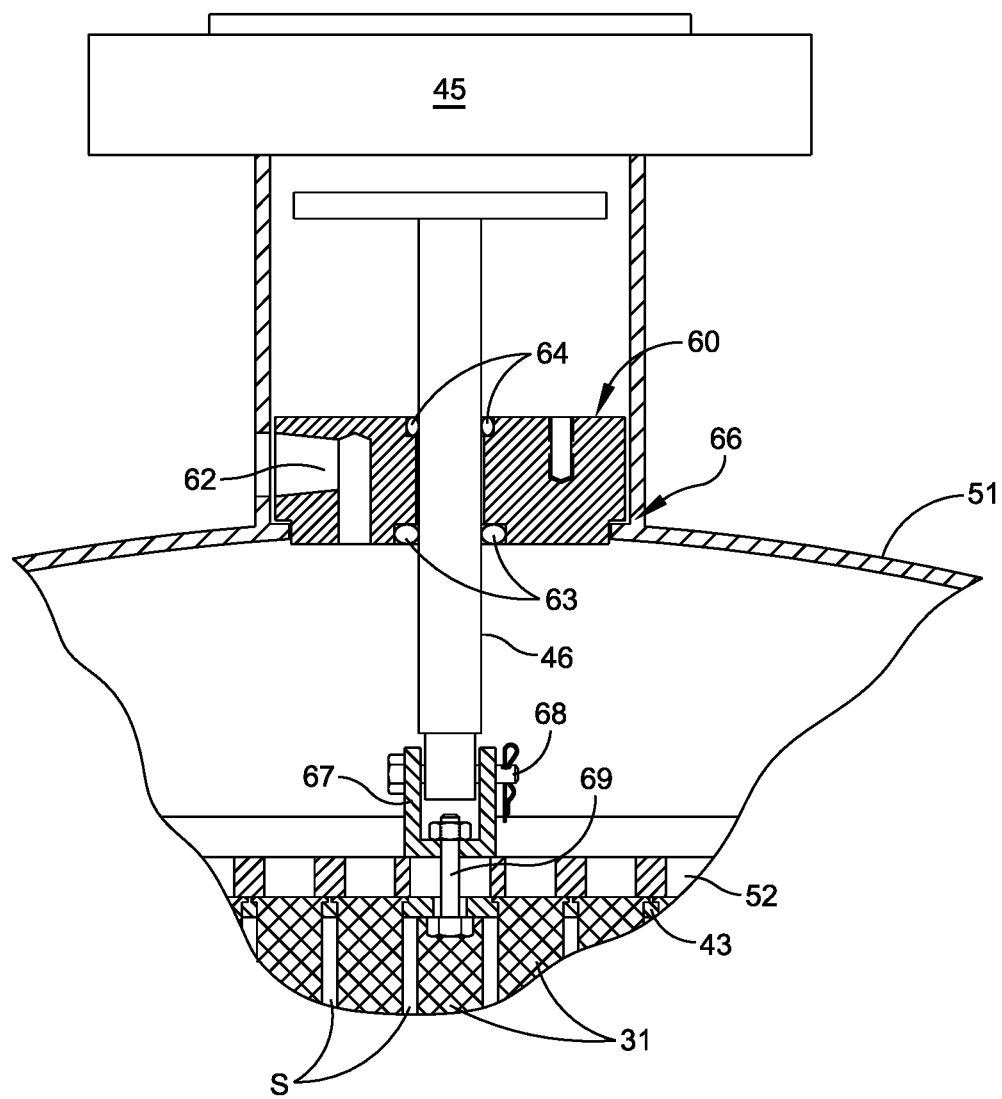
FIG. 21A is a cross-sectional view similar to that depicted in FIG. 3A and illustrating further details.

Reference is now made to FIGS. 18-21 that illustrate the flange mechanism 60 while FIG. 21A illustrates the positioning of the flange mechanism 60 relative to the dome 51 and the actuator 45. This cylinder mechanism 60 eliminates essentially 100% of the entrained air from the filter and is integrated into the cylinder mounting flange. FIG. 18 is a side view of the cylinder mounting flange. FIG. 19 is a top view of the cylinder mounting flange of FIG. 18. FIG. 20 is a cross sectional view of the cylinder mounting flange of FIG. 18. FIG. 21 is a bottom view of the cylinder mounting flange of FIG. 18. In FIG. 21A the actuator 45 is shown as a block but it is understood that any type of an actuation mechanism may be provided that allows an articulation of the actuation rod 46 (up and down motion). The flange mechanism 60 is also referred to as a cylinder mounting flange and its basic function is to provide a seal with the actuation rod 46 while at the same time allowing, through port 62 the escape of entrained air that is provided within the dome 51. As indicated in FIG. 21A, for this purpose there may be provided a seal at location 63 and a seal at location 64 both of which will provide a sealing action between the mechanism 60 and the actuation rod 46. Each of the seals 63, 64 may be formed by an O-ring seal. A further seal may be provided at 66 in FIG. 21A and could be in the form of another O-ring or the like.

FIGS. 22 and 25 illustrate an important feature of the present invention in one particular embodiment. This embodiment provides filter elements that are relatively closely spaced apart but includes bridging members B. This bridging comes about by the particular geometry that is selected. This provides a novel surface area significantly different than that provided in the prior art. In this embodiment it is desired that all filter elements have a bridge component so that in its entirety the filter array functions as a monolithic structure with all filter elements essentially connected as a single unit. It is noted that in the prior art filter elements are supported independent of and spaced relative to each other and are usually spaced apart at least the width of a predetermined filter element.

Reference is now made to the improved filter element bundle or array 70 shown in FIG. 22, and a more detailed view in FIG. 25 of a limited number of the filter elements 72. Unlike filter elements of the prior art, in accordance with the present invention the array is a series of filter elements 72 that are disposed with a closed interstitial space S provided between adjacent filter elements 72. This interstitial space S is formed in the embodiment of FIG. 22 by means of bridging elements or members B that, with the outer surfaces of adjacent filter elements 72 provide a closed interstitial space S. In the embodiment of FIG. 22 the interstitial space S is somewhat triangular and is essentially disposed between three adjacent filter elements 72 with the adjacent filter elements being interconnected by bridging members or elements B.

Figure 23:
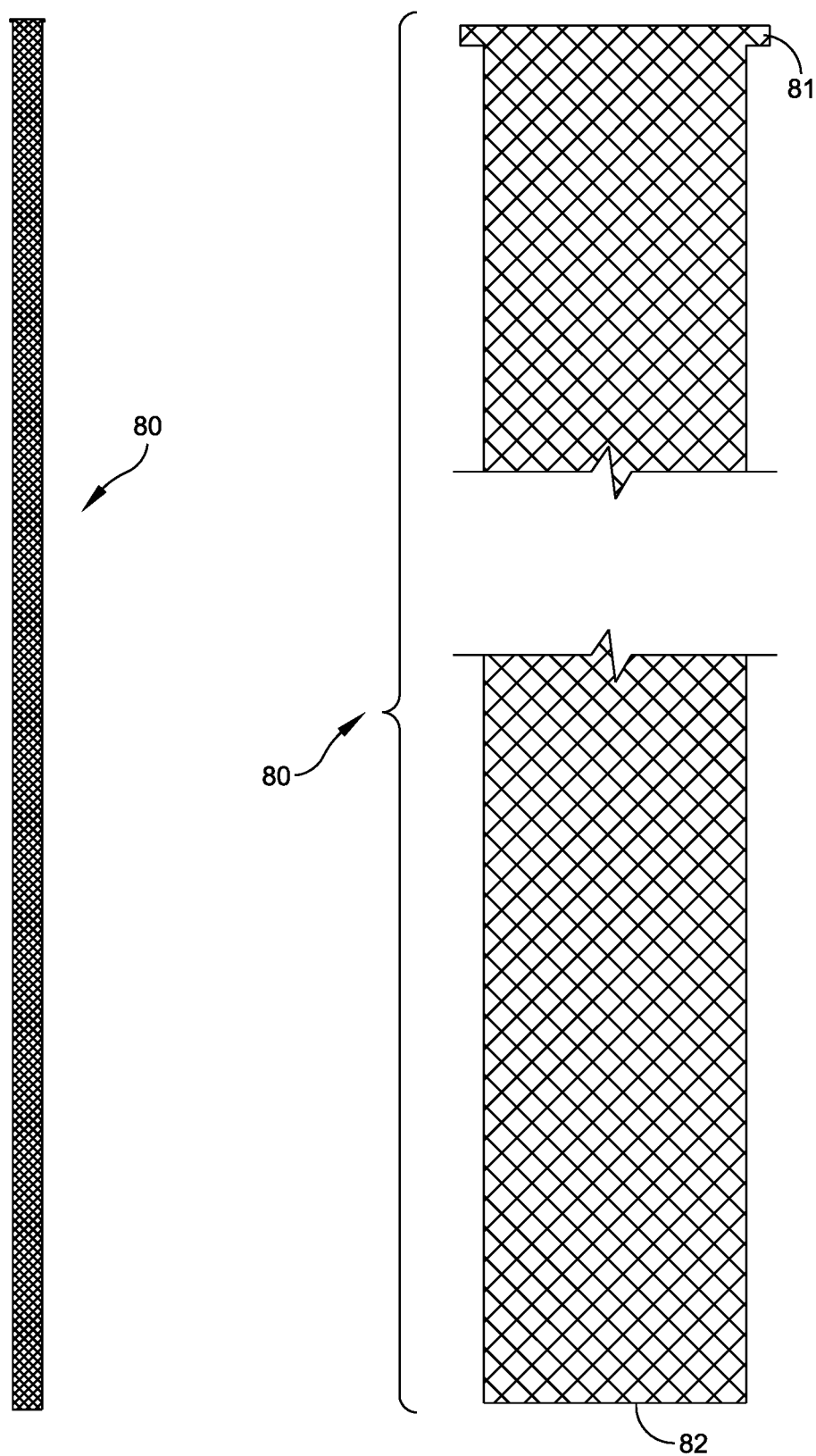
FIG. 23 is a cross sectional view of one of many possible permeable single layer filter elements.

Reference is now made to the embodiment shown in FIG. 23 as far as a construction of a filter element is concerned. This describes a single layer filter structure and may be considered as in the form of a long thimble formed out of window screen, or printed using additive manufacturing techniques. It would be permeable and essentially rigid at the same time. The structure also would not require an internal support structure in order to maintain vertical rigidity nor diametric rigidity; thus resisting collapse from differential pressures. The regenerative media will cake on the outer surface of the structure and collect entrained particles as the fluid passes through the media cake progressing up through the filter element and out through the tube sheet. The filter element or sheath 80 may be fused at 82 to close the sheath, and furthermore has a top flange 81. Refer also to FIG. 5A showing how the flange is used to secure the filter element relative to the tube sheet.

Figure 24:
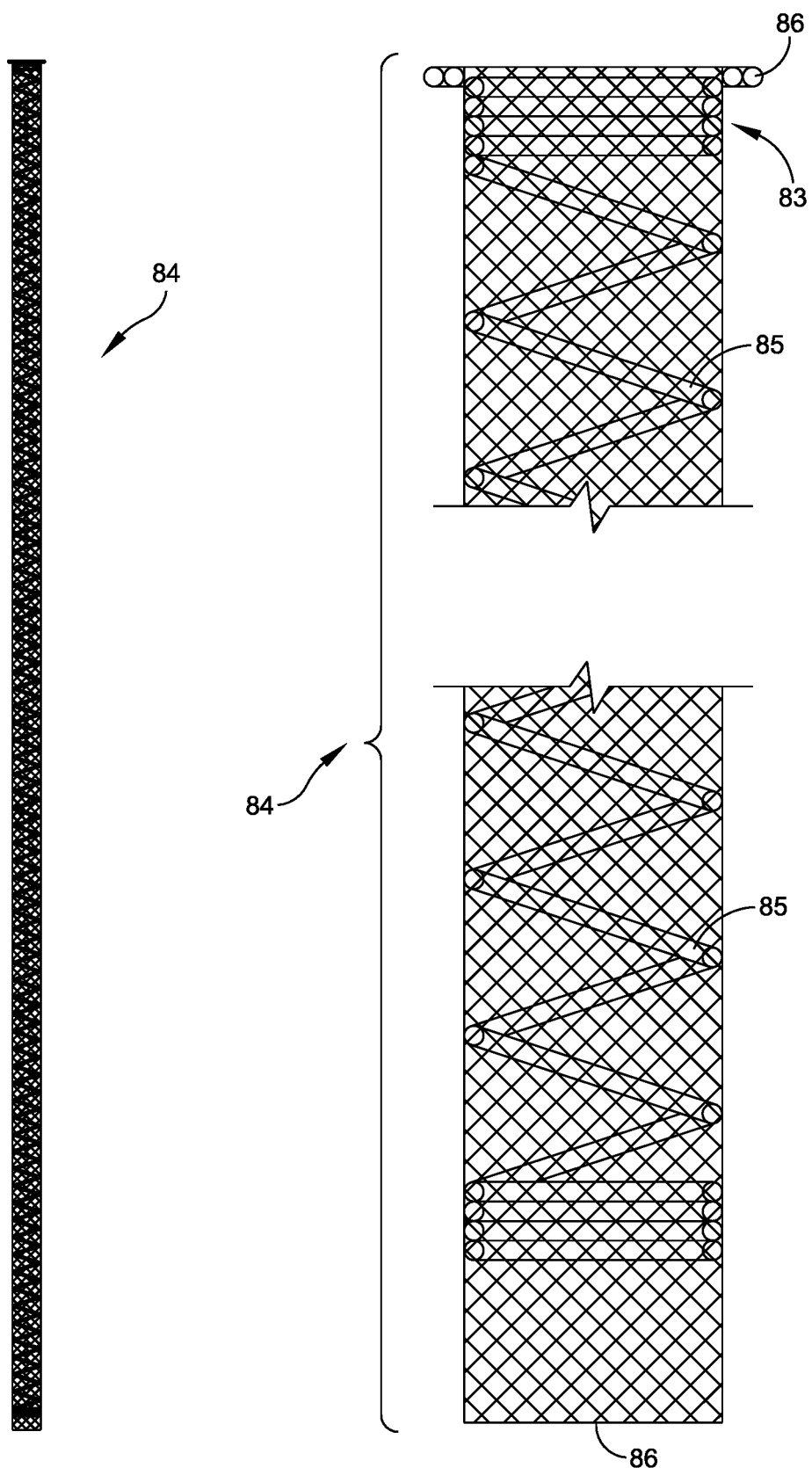
FIG. 24 is a cross sectional view of one of many possible embodiments of a double layer filter element.

Reference is now made to the embodiment shown in FIG. 24 as far as another construction of a filter element is concerned. Thus, FIG. 24 illustrates the use of a spring 85 associated with an outer sheath 84. The spring 85 may be a cylindrical shaped coil spring structure. The spring is formed, so that when fitted within the sheath, it will pass through a close tolerance hole in the tube sheet up to the pancake wound upper section 83. The spring 85 may be pre-loaded and thus serves to stretch the sheath and keep the diameter true for the entire length. The spring 85 also resists collapse when differential pressures act on the filter media across the boundary zone. The sheath may be fused at 86 to close the sheath over the pre-loaded spring 85.

Figure 24A:
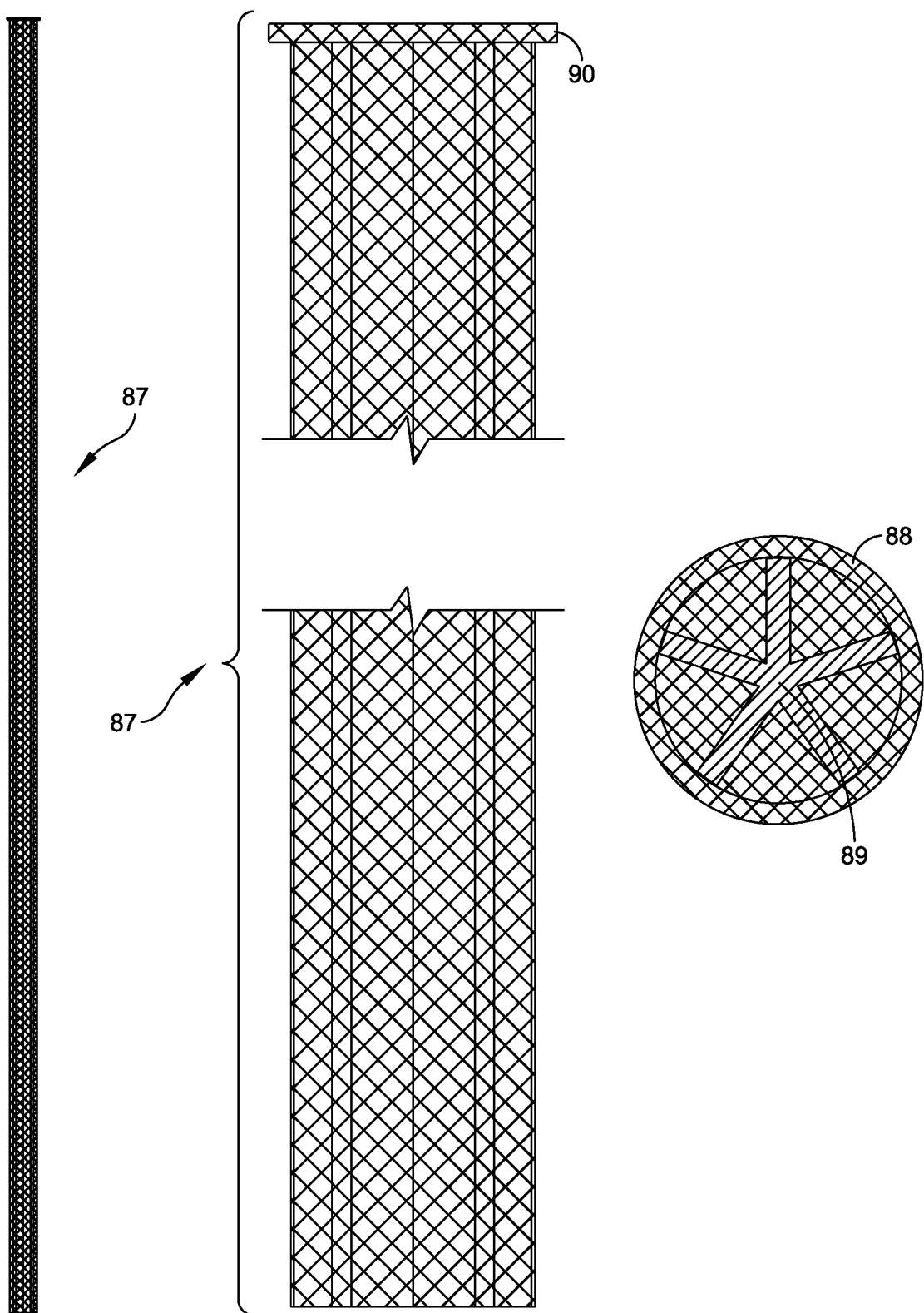
FIG. 24A is a cross sectional view of an alternate embodiment to that shown in FIG. 24.

Reference is now made to another embodiment of the filter element as shown in FIG. 24A. This describes an alternate embodiment of the filter element. This describes a sheath 87 that may be provided with a top flange 90 so as to secure the filter element in a proper position relative to the tube sheet. Within the sheath 88, there is provided a support structure 89 that, in a cross-section, is an asterisk or star-shaped. This structure may also be formed of window screen or can be a printed product. The material is permeable while at the same time having some level of rigidity.

Reference is now made to the embodiment of the filter element as shown in FIGS. 22 and 25. FIG. 25 is a fragmentary and enlarged cross sectional view showing in greater detail a portion of the filter element array as taken from a portion of FIG. 22. Thus, there is provided an improved filter element bundle or array 70 shown in FIG. 22, and a more detailed view in FIG. 25 of a limited number of the filter elements 72. With the present invention the array is a series of filter elements 72 that are disposed with a closed interstitial space S provided between adjacent filter elements 72. This interstitial space S is formed in the embodiment of FIG. 25 by means of bridging elements or members B that, with the outer surfaces of adjacent filter elements 72 provide a closed interstitial space S. In the embodiment of FIG. 25 each interstitial space S is somewhat triangular and is essentially disposed between three adjacent filter elements 72 with the adjacent filter elements being interconnected by bridging members or elements B.

Figure 25C:
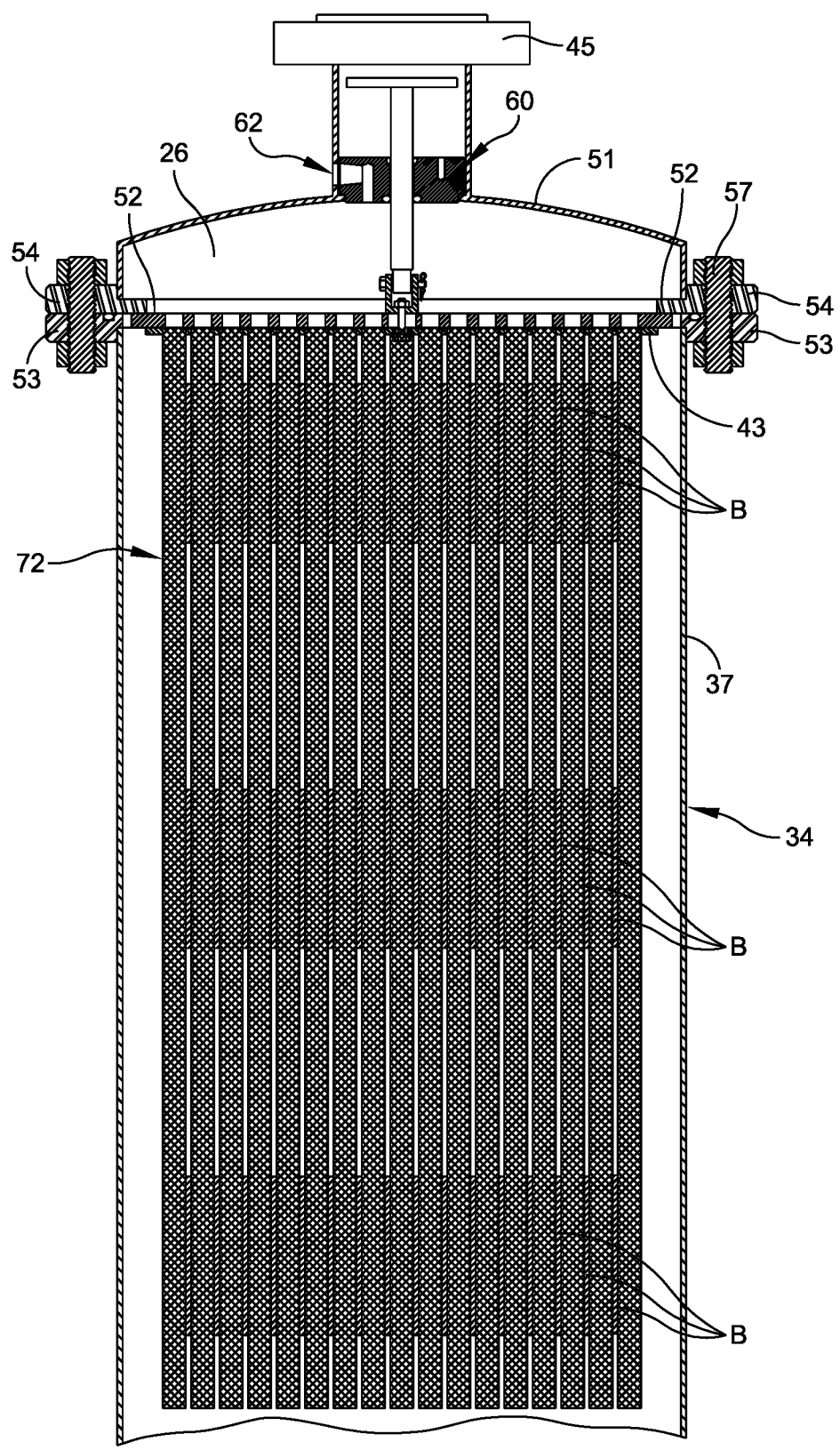
FIG. 25C is a sectional view similar to that illustrated in FIG. 3A and showing spaced apart bridging members.
Figure 25D:
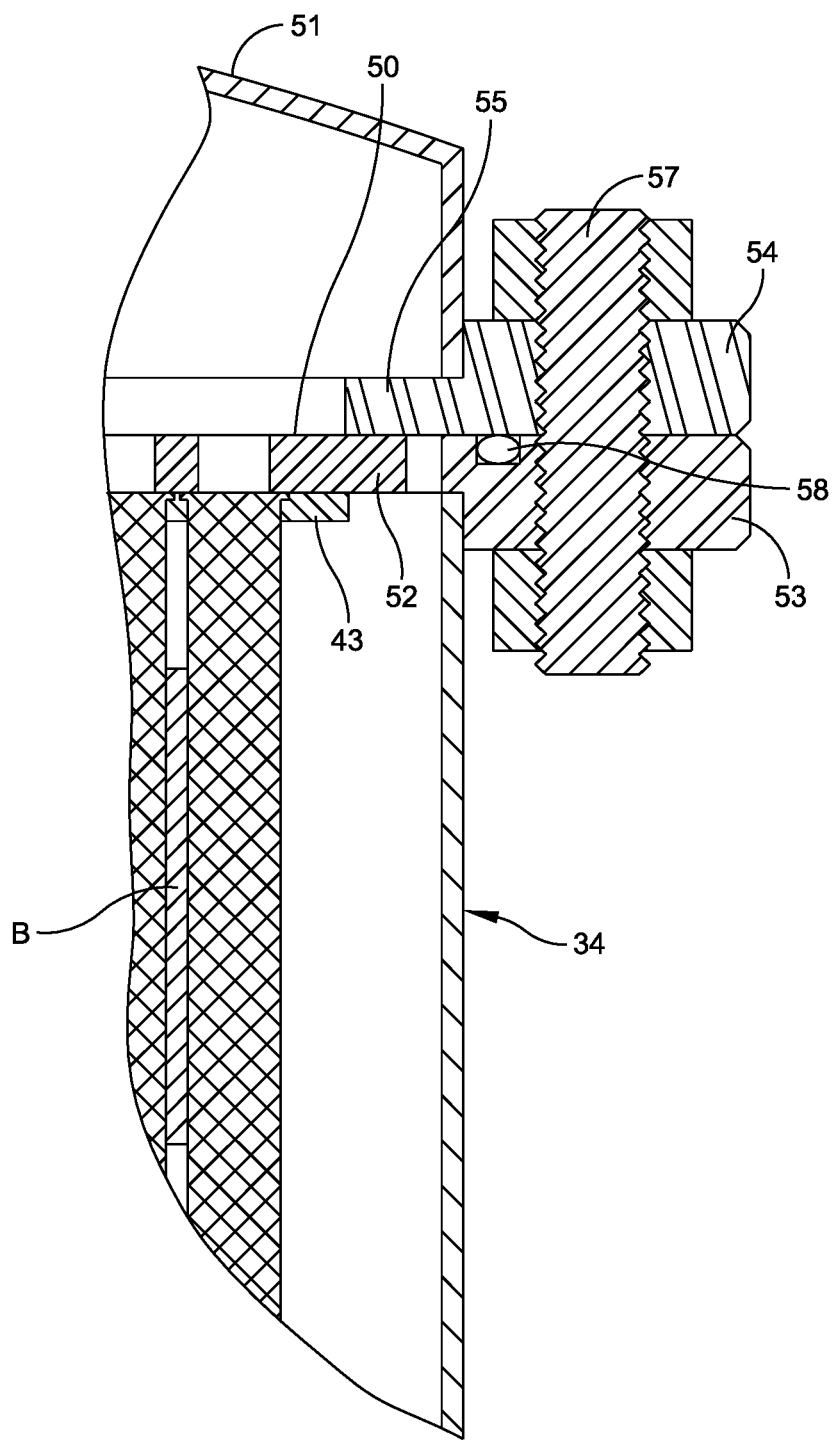
FIG. 25D is an enlarged fragmentary view related to the embodiment of FIG. 25C.

Reference is also now made to FIGS. 25A-25D that illustrate further detail and that the bridging members B are now actually illustrated as connected between adjacent filter elements 31. In the embodiment illustrated in FIGS. 25A and 25B a single elongated bridging member B is illustrated as extending the entire length of each filter element 31. In the embodiment illustrated in FIGS. 25C and 25D, separate bridging members B are employed. As illustrated in FIG. 25C, these bridging members may be spaced apart along the length of each filter element. FIG. 25D shows a single one of the bridging members B connecting adjacent filter element 31.

Figure 26:
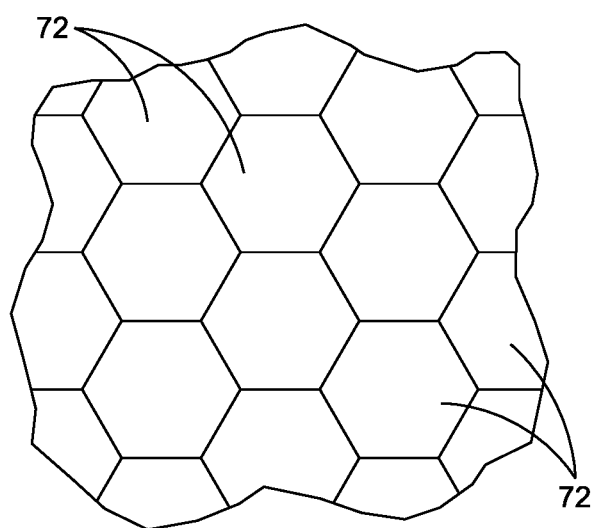
FIG. 26 is a schematic view of another embodiment of the filter element array having a honeycomb construction.
Figure 26A:
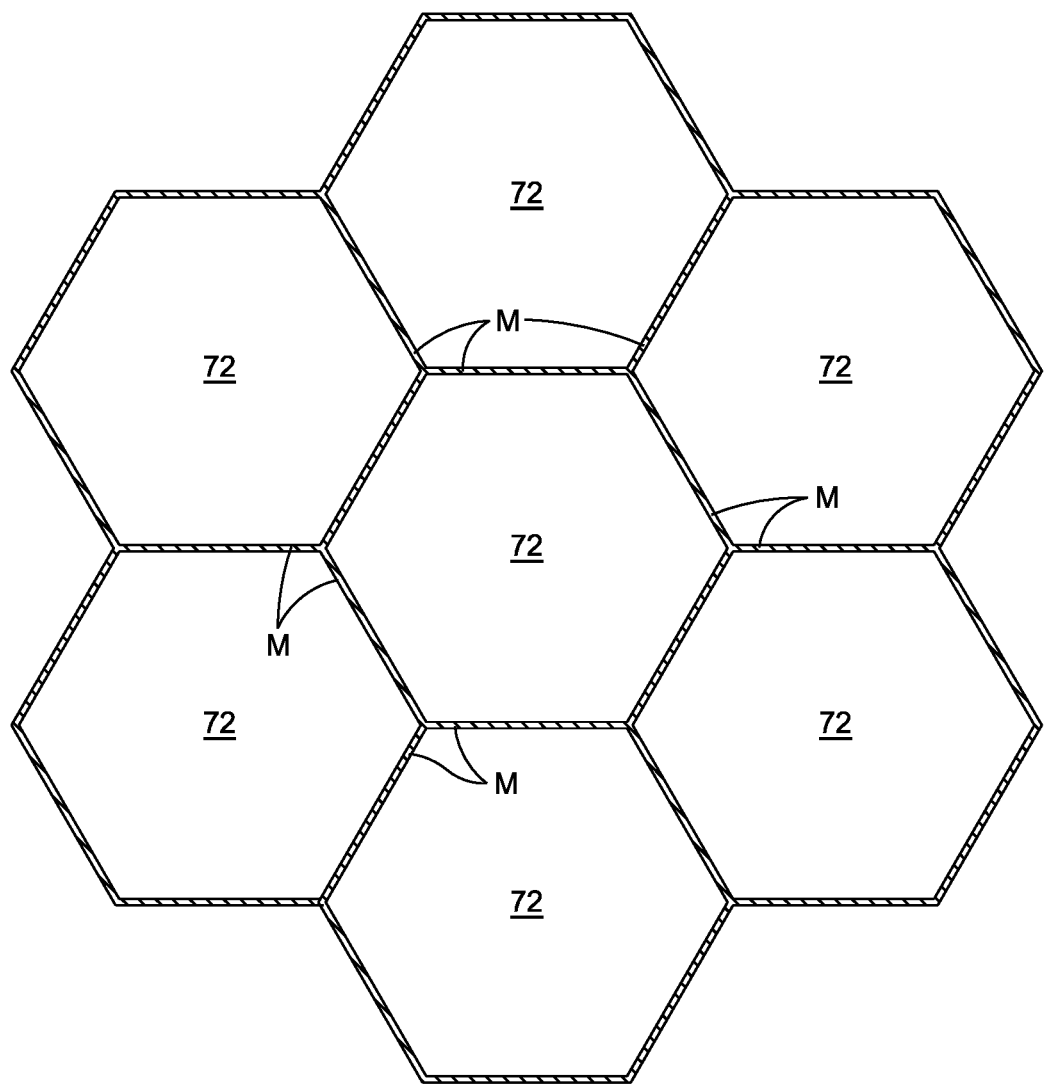
FIG. 26A is a more detailed diagram showing the honeycomb array.

FIG. 26 is a fragmentary view of another filter element configuration wherein the filter elements are formed in a honeycomb structure. In FIG. 26 the honeycomb structure is shown somewhat schematically without illustrating any element wall thickness, but showing the general structure. The filter elements 72 depicted in FIG. 26 are each of hexagonal shape and are arranged in a honeycomb pattern. As each of the filter elements have to be pre-coated with a filter media, in a workable embodiment there would be interstitial spaces provided between each of the hexagonal elements, such as illustrated in FIG. 26A and described hereinafter. Thus, some of the hexagons illustrated in FIG. 26 are provided with filter elements having a space surrounding the filter elements. If one sizes the elements in combination with the planar displacement of the holes for FIGS. 10-13, one could alternatively effect round roles or geometrically matched holes to the shape of the filter element (i.e., hex for hex, round for round, square for square, star for star, etc.). One must keep in mind that the construction is in the form of a "sandwich" of FIG. 12 onto FIG. 10 thus capturing the flange of the element, via a formed surface as in FIG. 23 or a "wound core" surface as depicted in FIG. 24 and as long as the flange will not fit through the member in FIG. 10 and the hole in FIG. 12 is correspondingly sized to seal the elements forcing the fluids to pass through the filter media.

FIG. 26A illustrates a more pragmatic structure of the filter elements as has been illustrated and described in connection with FIG. 26 and is in the form of a honeycomb structure. FIG. 26A provides some additional detail by further illustrating the application of the media layer at M. The media layer is thus disposed between each of the facing sides of respective filter elements 72.

Figure 26B:
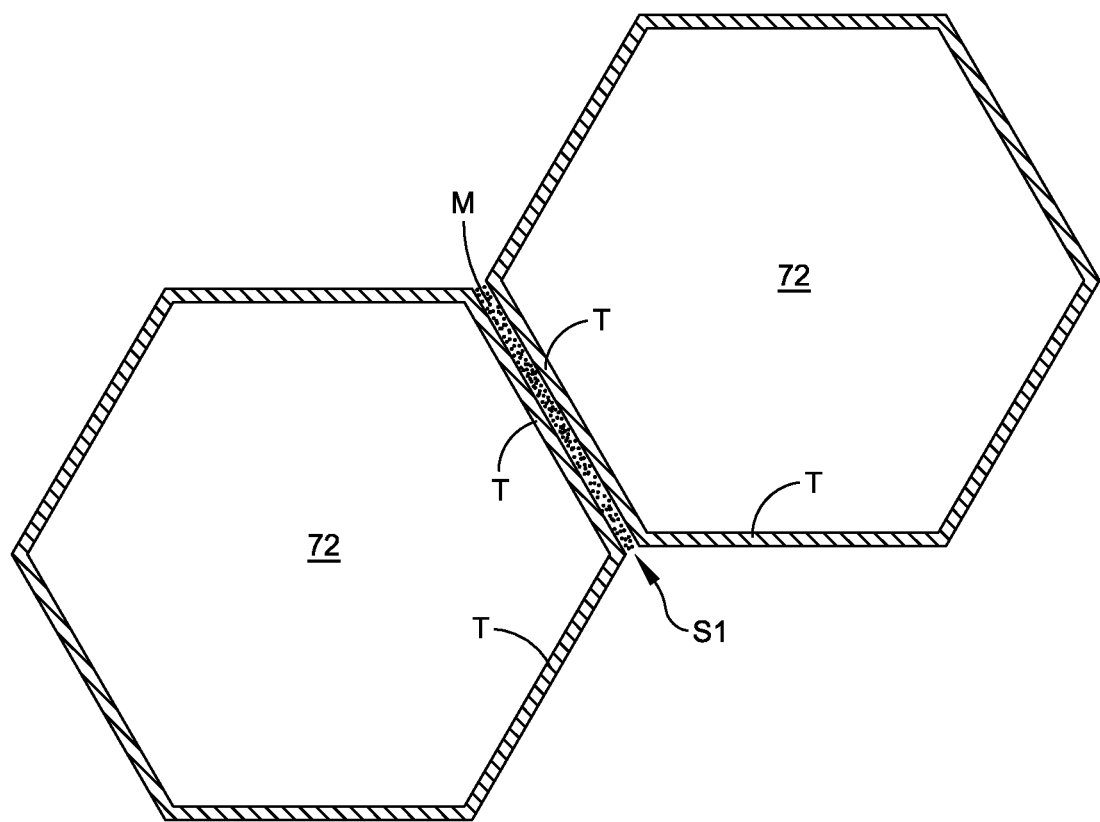
FIG. 26B shows still more detail of the honeycomb structure as between adjacent filter elements.

Refer now to a further detail in FIG. 26B. This figure provides even more detail for the arrangement that is illustrated in FIGS. 26 and 26A. The filter media M would, of course, be disposed between each of the adjacent filter elements 72. In FIG. 26B, for the sake of simplicity, only two of the adjacent filter elements 72 are illustrated. Each of these filter elements may be considered as having some wall thickness as identified in FIG. 26B by the reference number T. FIG. 26B also illustrates the interstitial space S1 which is essentially disposed between facing surfaces of the respective filter elements 72. FIG. 26B also illustrates by simple cross hatching the location where the filter media is disposed essentially between facing walls of respective filter elements 72.

Figure 27:
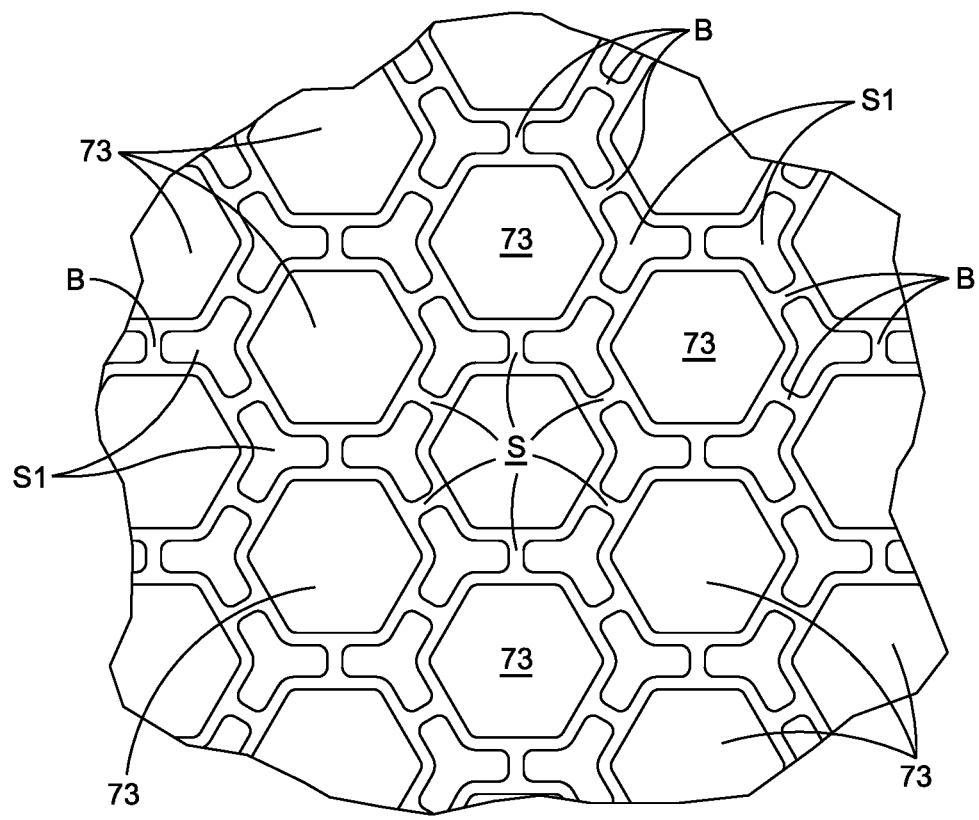
FIG. 27 is a fragmentary and enlarged cross sectional view of still another embodiment of the filter element array showing the filter elements as well as a series of bridge elements that together form the closed interstitial spaces.

Reference is now made to a different embodiment illustrated in FIG. 27. This describes another honeycomb arrangement in which a series of six filter elements 73 are arranged about a center closed interstitial space S1 defined by a center filter element. This essentially combines the function of a honeycomb structure with one in which a closed interstitial space is furthermore provided. Regarding the construction of FIG. 27, one could provide intermittent squares and circles as long as the following applies.

1. It exhibits point contact.
2. Provide a surface to coat with regenerative media.
3. Exhibits a packing density that results in interstices by which fluid may channel to fully access the complete height of the element, and essentially the opposite of what is demonstrated in FIG. 26 whereby the elements are in intimate contact with essentially zero interstices.

Thus, FIG. 27 describes the filter element 73 of hexagonal shape as well as a series of bridge elements B that together form the closed interstitial spaces S1. In this regard, one may also make reference to, for example, FIG. 2 of the present application wherein fluid flow is illustrated by means of the dashed arrows 47. Although this interstitial space S1 is illustrated as being closed, it is open at its bottom end but forms an enclosed structure that enables the fluid to pass through this interstitial space and through the filter media into the interior of each filter element. Although the filter elements depicted in FIG. 27 are hexagonal, these filter elements can be of various different shapes including circular, oval and star-shaped. The top of each space S1 is preferably closed off.

Figure 27A:
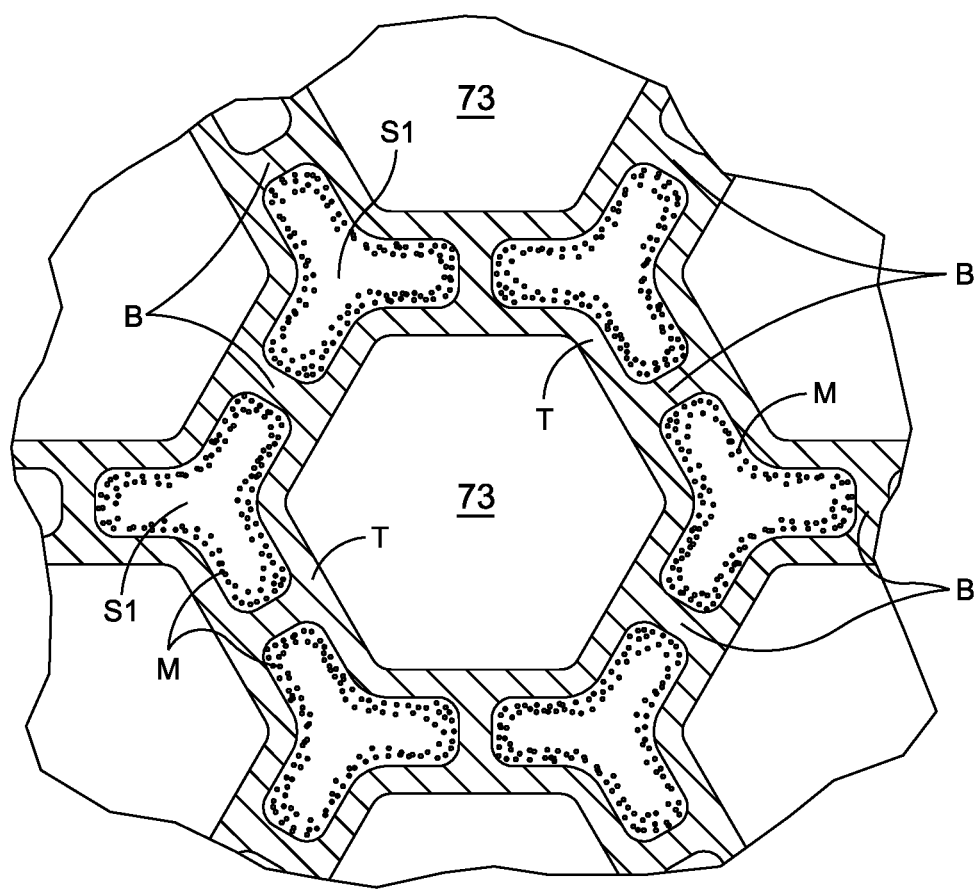
FIG. 27A is an enlarged view at adjacent ones of the filter elements in the embodiment of FIG. 27.

FIG. 27A provides some further detail for the particular embodiment of the invention illustrated in FIG. 27 and showing only a limited number of filter elements 72. Each of the filter elements 72 may be constructed as illustrated in FIG. 27A each having a wall thickness T. FIG. 27A also illustrates the bridging connection B that is formed between adjacent facing walls of respective filter elements. This bridging and the filter elements themselves defines an interstitial space S1. In this space the media layer coating is provided as illustrated by the reference number M. Each bridging member B may be a physical wall structure that extends between facing walls that define each filter element 73.

Figure 28:
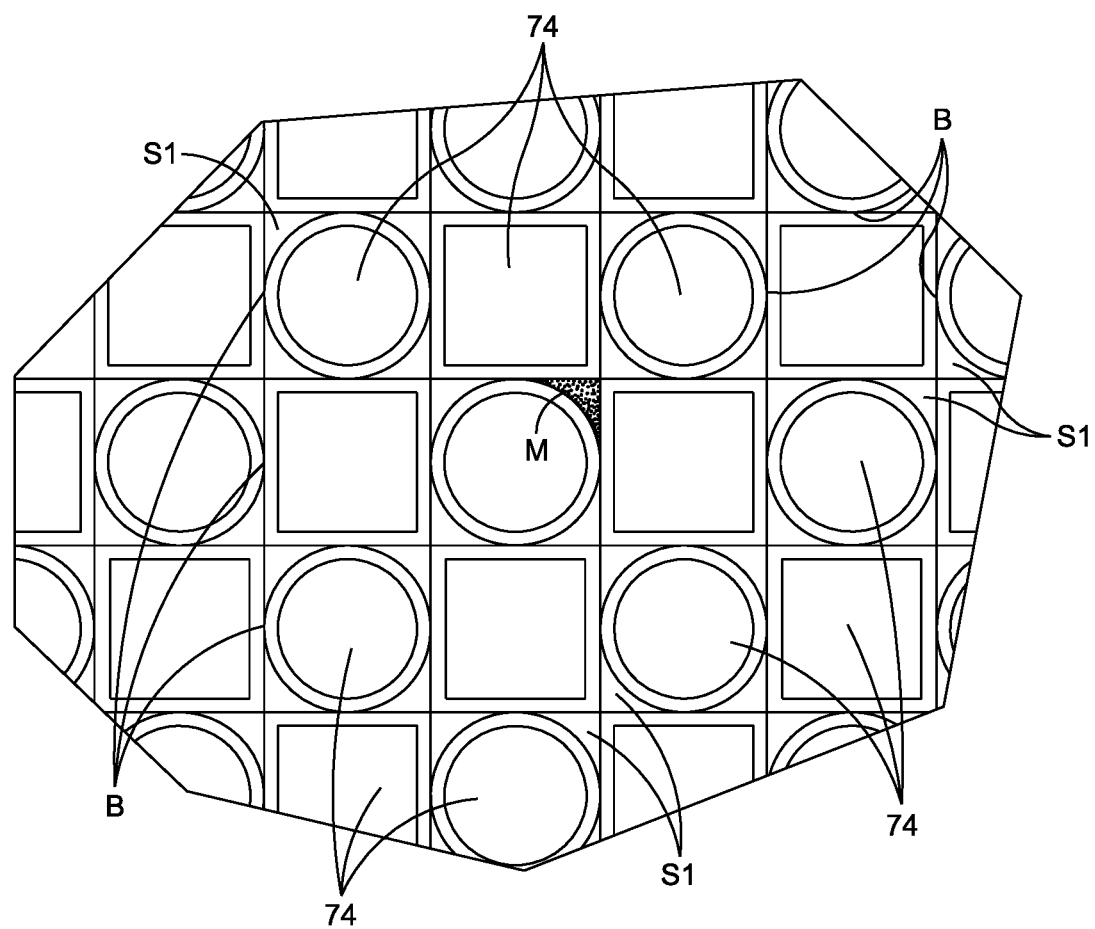
FIG. 28 is a fragmentary view of another embodiment of the filter element array.

FIG. 28 depicts a different type of honeycomb structure of the filter elements in which certain ones of the filter elements have a square or rectangular cross-section and other ones of the filter element are circular as clearly illustrated in FIG. 28. Where the square elements abut the circular elements, there is a bridging as indicated at B in FIG. 28. This bridging, along with the filter elements, forms the closed interstitial spaces S1. For example, one interstitial space S1 may be demarcated by adjacent square filter elements and one of the circular filter elements. This bridging may be simply in the form of a connection point between the filter elements or could be a small interconnecting wall. FIG. 28 also shows media caking at M but only in one illustrated area. Of course this media caking would cover all interior areas demarcated by the interstitial spaces S1.

Figure 28A:
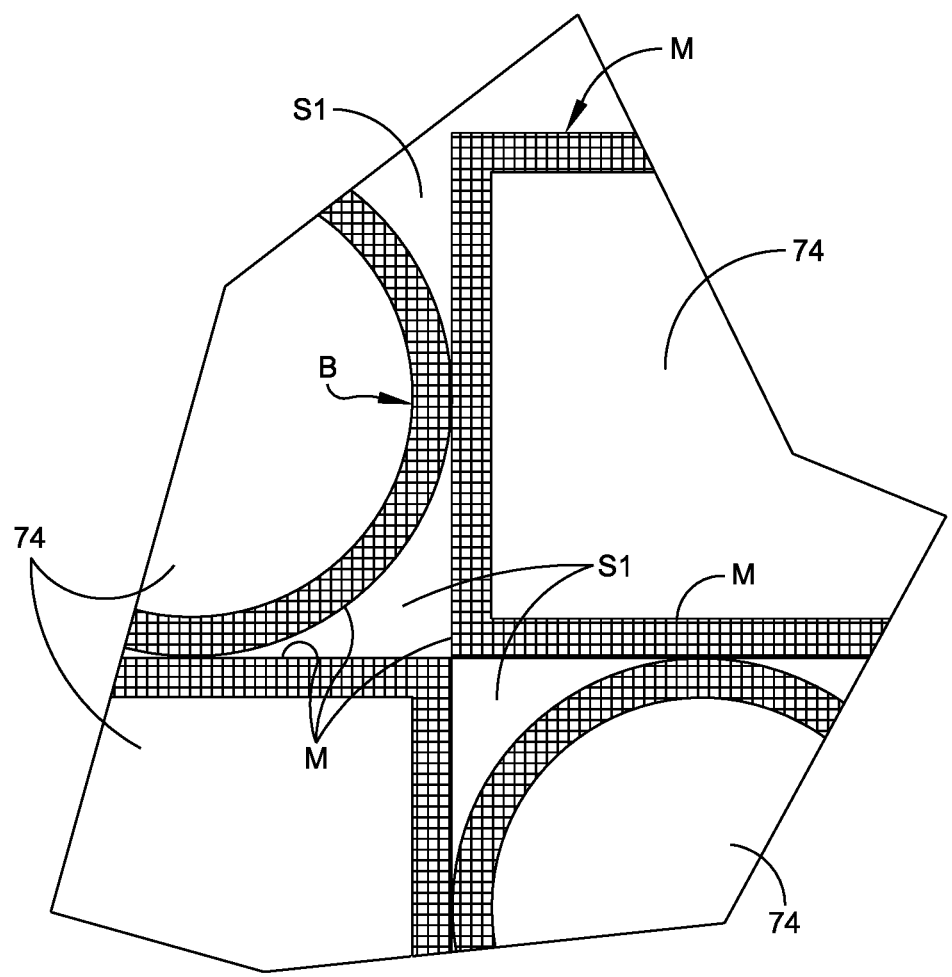
FIG. 28A is a fragmentary enlarged view of the embodiment shown in FIG. 28.
Figure 28B:
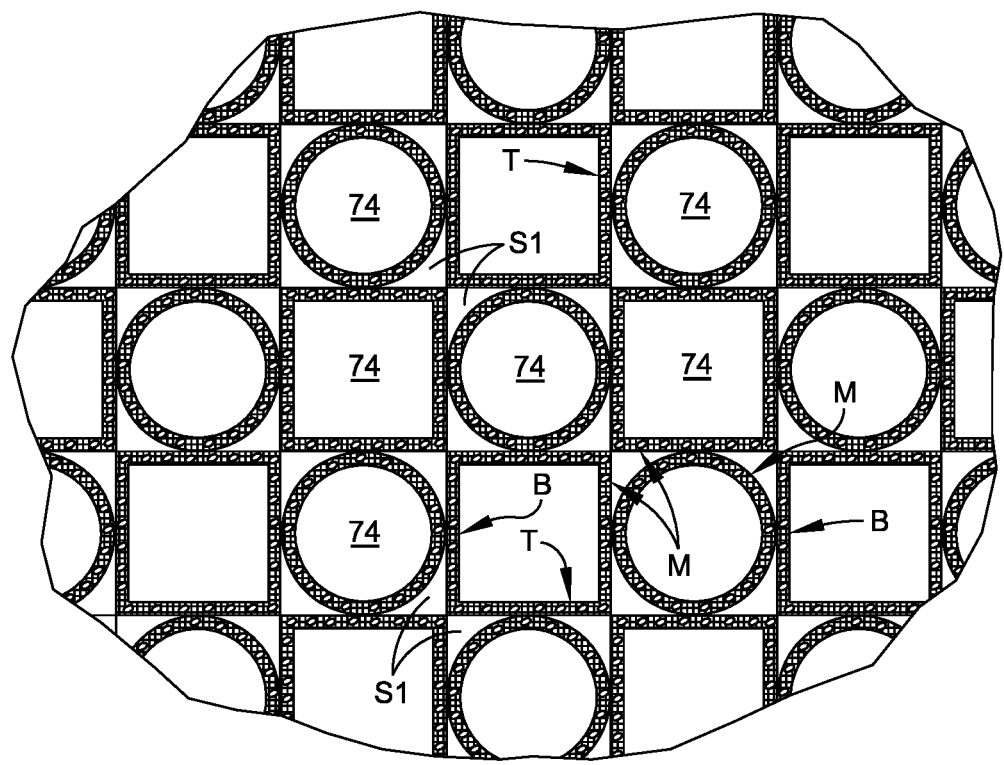
FIG. 28B shows more detail of the embodiment of FIG. 28.
Figure 28C:
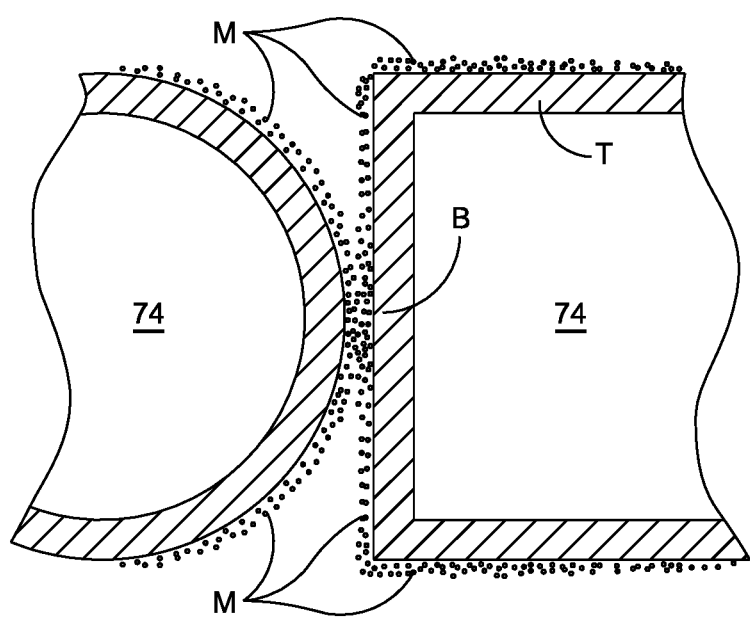
FIG. 28C is an illustration arranged between adjacent filter elements in the embodiment of FIG. 28B.

FIG. 28A is a fragmentary enlarged view of the embodiment shown in FIG. 28. FIG. 28B shows more detail of the embodiment of FIG. 28. FIG. 28C is an illustration arranged between adjacent filter elements in the embodiment of FIG. 28B. FIGS. 28A through 28C depict further details relating to the version of the present invention illustrated in FIG. 28 wherein different shapes of adjacent filter elements are provided. This includes a substantially square filter element that has a contact location relative to a circular filter element. It is the location where the circular filter element is essentially tangential to the square filter element where the bridge member B is located. Refer to FIG. 28 for an illustration of the location of the bridging member B. In the depiction of FIG. 28C, an actual small physical bridging element B is provided so that there is physical contact or connection between the adjacent filter elements 74. These added figures also illustrate the location of the media layer M, particularly in FIG. 28C, and the corresponding wall thicknesses T of the respective filter elements. In FIG. 28C there is actually illustrated a small wall between adjacent filter elements defining the bridge element B.

In accordance with the present invention, and regarding the overall filter element bundle, the "bridging" can be provided in one or more ways. For the most part, in the illustrated embodiments herein, the bridging B is formed by a physical connection between adjacent filter elements. Refer, for example, to FIG. 27A. In other embodiments of the present invention, the bridging may occur by virtue of a contact area or location between adjacent filter elements with or without a physical connection. In this regard refer to, for example, FIG. 28 wherein the bridge members are considered to be formed by a physical contact, such as where the round filter element is tangential to the square filter element. Lastly, refer to the more detailed view of FIG. 26B where no physical bridge is used, but due to the close proximity of adjacent filter elements the overall filter element bundle forms as a monolithic structure.

Reference is now made to respective schematic diagrams shown in FIGS. 29A through 29F. The diagrams shown in FIGS. 29A through 29C provide some further detail regarding the interface between adjacent filter elements 72 for essentially three different versions. This relates to the structure shown in FIG. 25 where all filter elements are circular in cross-section. FIG. 29A shows the filter elements touching at a contact point at B. FIG. 29B has the filter elements with a spacing G therebetween. FIG. 29C has the adjacent filter element 72 connected by the physical bridge structure B. Reference is now also made to FIGS. 29D through 29F which relate essentially to the embodiment in FIG. 28 wherein the filter elements 74 alternate between cylindrical and square filter elements. These figures illustrate different interfaces between adjacent filter elements. FIG. 29 D shows a joining by a touching at location B between the filter elements. Because one of the filter elements is circular in cross-section, the touching is essentially at a substantially single point location where the square filter elements is essentially tangential to the circular filter element. FIG. 29E illustrates the filter elements separated by a spacing or gap G. FIG. 29F illustrates the filter elements physically interconnected by a bridge member B. FIGS. 29A through 29F also illustrate the area of the interstitial spacing; the media material M; and the bridge members B.

With respect to FIG. 27A this illustrates a physical bridge B between adjacent filter elements while FIG. 28A shows a touching at location B between adjacent filter elements. For the instance, such as shown in FIG. 26B where adjacent filter elements are spaced apart as indicated at S1 in FIG. 26B there is a critical spacing that, while occurring, has to be in relatively close proximity to each other in order to maintain a monolithic structure, and to furthermore provide a structure to essentially inhibit fluid turbulence.

In the case illustrated in FIGS. 29B and 29E, there are provided closely spaced filter elements, but filter elements that are not bridged or in contact. From initial experiments, it has been determined that the gap between adjacent filter elements is less than a width of the filter element. It has furthermore been found that between adjacent filter elements, there is a maximum tangential geometric proximity of ⅕ the minimum cross-sectional distance across a single filter element, or less. This arrangement provides a sufficiently monolithic structure that defeats turbulence in a manner similar to that provided with the use of a bridging or contact element. Regarding the term "tangential geometric proximity" this is considered to be the measured distance between the closest tangents of two adjacent filter elements in their nominal unperturbed state. Thus, by way of example, if a particular filter element has a diameter of say X millimeters, then the spacing between adjacent filter elements has to be ⅕ X or less. This provides for a tight monolithic structure even without physical bridging elements between adjacent filter elements.

Features and Additional Aspects

1. This invention optimizes the relationship between a) the diameter of the filter elements b) the planar spacing of the elements c) the volume of regenerative media d) the resultant interstitial free space when the filter elements are coated with filtration media e) the shell diameter of the filter housing, f) the height and "zones" of the regenerative media filter.

2. This invention has a resultant filtration structure made up of individual filtration elements arranged within a containment vessel such that when the particulate filtration media uniformly coats the filtration elements via flow and Bernoulli's Principle, the unified filtration structure is that of a highly efficient honeycomb structure. Refer to FIGS. 26, 26A, and 26B.

3. The individual filtration elements and their individual effective surface areas combine differently in this invention than that of current state-of-the-art filters because of the optimized design of the relational aspects of the elements and the intelligent, intentional bridging that takes place. The bridge itself is a new surface area that a) increases the effective surface area and b) the stability of the filtration zone, which c) enables a decrease in the size of the effective filter buffer zones of the filter beyond what the existing state-of-the-art filters deploy.

4. The cross sectional profile of the elements are not fixed, but variable.

5. The relative distance of the elements to each other are not fixed, but variable.

6. The particulate size of the filtration media is not fixed, but variable.

7. Each of the three aforementioned variables is sized in consideration of the filtrate such that there will be a resultant honeycomb structure to maximize the efficiency of the filtration system.

8. By highly optimizing the filtration zone of the invention, the other zones can be optimized as well. Current state-of-the-art filters must employ sloppy and excessive buffer zones. This invention essentially eliminates random element turbulence.

9. Additional improvement was effected by articulating the tube sheet element assembly by means of a self-contained cylinder, which has a piston attached to a shaft that penetrates the tank through a seal arrangement that is inherently safe in that any leakage from the power side of the cylinder, be it air or hydraulically operated, will leak to atmosphere and not to the process fluid as is the risk of the current state-of-the-art regenerative media filters. Refer to FIGS. 3 and 3A.

10. Full capture and removal of entrained air. Refer to the escape port 62 in FIGS. 3A and 21A.

11. Reduced height of the influent and effluent connections due to the optimization of the overall filter results in energy savings.

12. Reduction in the filter footprint reduces the cost of the building required to house the filter.

13. The structure of the filtration element is innovative such that they are of two types: double layer or single layer.

14. Unlike current state-of-the-art elements which utilize 5 or more parts to form one filtration element (washer, grommet, support core, sheath, plug) this element uses a hollow, permeable sheath that will be innovatively sealed at either end by means of fusing the sheath (filter element) material. Fusion may occur by heating such that the sheath fusion welds to itself, sonic welding, chemical bonding with a non-residual activator (as in the case of catalytic molecular bonding of plastics) or any other means to bond the sheath upon itself leaving only a sheath and a support core, not an additional item. Refer to FIGS. 23, 24 and 24A

15. Alternatively, in the case of a double later element, one or both layers may be manufactured using additive manufacturing such as 3D printing. In this way, a selectively permeable sheath is printed on the outside of a support core, with one end sealed and the other constructed such that the interface will seal against undesirable bypass of unfiltered medium to filtered medium.

16. Double layer filtration elements are constructed with only a support core and a sheath. The support core may be preloaded to effect a straightening force on the sheath. In order to maximize the packing density of the filter elements, while at the same time facilitating even coating of the regenerative filter media, a series of well placed "spacing maintainers" may be designed into the elements. In the case of a compression spring-like wound helix that may be pre-compressed to maintain a taught sheath and prevent differential pressure collapse as the filter element becomes loaded with filtrate, nominally wound diameter with staggered or equally spaced larger coils maintain proper spacing in the honeycomb structure previously described.

17. Double layer filtration elements will necessarily have one end open to the boundary layer such that the filtered material passes through from the unfiltered zone to the filtered zone. That boundary may be a traditional tube sheet, or it may mimic the capillary system in a living organism, whereby the filtered material passes through the element and into a collection zone that transports the filtered material to a progressively larger transport trunk, not unlike the human arteries, as opposed to the current state-of-the-art tube sheet boundary filtration model.

18. Double layer filter elements may be formed from permeable material that is wound and then bonded or formed into any number of geometric forms that are either a) advantageous to some containment system b) specific to the material being filtered c) specific to the nature of the filtered contaminant d) advantageous to the designed differential pressures of the filter zones e) velocity of the filtered media f) viscosity of the filtered media g) bulk density of the filtered media.

19. Double layer filter elements may be formed such that the inner layer is hollow and is filled with a gas, the temperature of which is controlled separately from the media being filtered and may advantageously affect filtration performance (i.e. creating a zone in close proximity to the filtration boundary layer where soluble contaminant precipitates out and is collected in the filtration boundary layer).

20. Alternatively, single layer filter elements are designed to satisfy all of the characteristics of multiple layer filter elements (rigidity, permeability, ease of cleaning/revival by flushing or counter current movement within a fixed or moving stream, spacing, surface area ratio) while manufactured in one of a number of ways.

21. The single layer filter elements may be of a semi rigid permeable material (such as wire cloth that has been formed and fusion sealed on one end and formed to seal against bypass on the other end.

22. The single layer filter elements may be manufactured by additive manufacturing techniques such as 3D printing or other methods such as anode/cathode growth on a formed mandrel in a solution carrying the requisite elements.

23. Single layer filter elements will necessarily have one end open to the boundary layer such that the filtered material passes through from the unfiltered zone to the filtered zone. That boundary may be a traditional tube sheet, or it may mimic the capillary system in a living organism, whereby the filtered material passes through the element and into a collection zone that transports the filtered material to a progressively larger transport trunk, not unlike the human arteries, as opposed to the state-of-the-art tube sheet filtration model.

24. Single layer filter elements may be formed from permeable material that is wound and then bonded or formed into any number of geometric forms that are either a) advantageous to some containment system b) specific to the material being filtered c) specific to the nature of the filtered contaminant d) advantageous to the designed differential pressures of the filter zones e) velocity of the filtered media f) viscosity of the filtered media g) bulk density of the filtered media.

The foregoing is only preferred embodiments of the present invention, it is not intended to limit the present invention, any modifications within the spirit and principles of the present invention, made, equivalent replacement, or improvement should be included in the within the scope of the present invention.

The above descriptions only relate to the preferred embodiments of this invention, and do not restrict this invention. All the modifications, equivalent substitutions and improvements made based on spirit and principle of this invention are included in the protective range of this invention.

What is claimed is:
1. A regenerative filter comprising:
a filter housing defining a hollow volume, and having a flow inlet at a bottom of the filter housing and a flow outlet at a top of the filter housing;
a fluid path provided between the flow inlet and the flow outlet;
a plurality of filter elements each having an outer surface filter media applied thereto and functioning to filter particulate or contaminants from the fluid path;
said plurality of filter elements being disposed in an upright array, each filter element of the array being spaced from each adjacent filter element;
a tube sheet that is disposed within the hollow volume and spans a cross-section of the filter housing, that is for support of the plurality of filter elements;
a hold down plate that is disposed over the tube sheet for holding the filter elements in place and including a sealing surface;
and an actuation mechanism that is disposed over the hold down plate;

a lower tank flange and an upper tank flange, a series of fasteners for securing the lower tank flange with the upper tank flange, the upper tank flange having an inwardly extending cantilever section;

wherein the sealing surface of the hold down plate is urged against the cantilever section of the upper tank flange when the tube sheet and hold down plate is in an engagement position;

wherein the tube sheet and hold down plate is disposed in line with the lower tank flange in the engagement position; and wherein the lower tank flange is absent any inwardly extending cantilever section such that the tube sheet and hold down plate is free to move vertically within the housing.

2. The regenerative filter of claim 1 wherein the filter housing includes a base housing and a dome and wherein the upper tank flange has an outer securing flange, that is integral with and forms with the cantilever section, a ledge upon which the dome rests.

3. The regenerative filter of claim 2 wherein the outer securing flange of the upper tank flange has a height greater that a height of the cantilever section so as to form the ledge and dispose the outer securing flange of the upper tank flange entirely outside of the dome.

4. The regenerative filter of claim 3 wherein the base housing has a top edge that engages with the lower tank flange, said lower tank flange having a cut out section that receives the top edge of the base housing.

5. The regenerative filter of claim 1 including a sealing ring disposed between the upper tank flange and the lower tank flange.

6. The regenerative filter of claim 1 wherein the sealing ring comprises an O-ring.

7. The regenerative filter of claim 1 including a coil spring that is disposed within the filter element.

8. The regenerative filter of claim 7 wherein the coil spring comprises a compression spring wound helix that may be pre-compressed to maintain a taut sheath and prevent differential pressure collapse as the filter element becomes loaded with filtrate.

9. A regenerative filter comprising:
a filter housing defining a hollow volume, and having a flow inlet at a bottom of the filter housing and a flow outlet at a top of the filter housing;
a fluid path provided between the flow inlet and the flow outlet;
a plurality of spaced filter elements each having an outer surface filter media applied thereto and functioning to filter particulate or contaminants from the fluid path;
a tube sheet that is disposed within the hollow volume and spans a cross-section of the filter housing, the tube sheet providing support for the plurality of spaced filter elements;
a hold down plate that is disposed over the tube sheet for holding the filter elements in place and including a sealing surface;
a flanged connection for the filter housing including a lower tank flange, an upper tank flange, and a series of fasteners for securing the lower tank flange with the upper tank flange, the upper tank flange having an inwardly extending cantilever section;
wherein the sealing surface of the hold down plate is urged against the cantilever section of the upper tank flange when the tube sheet is in an engagement position; and wherein the lower tank flange is absent any inwardly extending cantilever section such that the tube sheet is free to move vertically within the housing.

10. The regenerative filter of claim 9 wherein the filter housing includes a base housing and a dome and wherein the upper tank flange has an outer securing flange, that is integral with and forms with the cantilever section, a ledge upon which the dome rests.

11. The regenerative filter of claim 10 wherein the outer securing flange of the upper tank flange has a height greater that a height of the cantilever section so as to form the ledge and dispose the outer securing flange of the upper tank flange entirely outside of the dome.

12. The regenerative filter of claim 11 wherein the base housing has a top edge that engages with the lower tank flange, said lower tank flange having a cut out section that receives the top edge of the base housing.

13. The regenerative filter of claim 12 wherein the tube sheet and hold down plate is are disposed in line with the lower tank flange in the engagement position.

14. The regenerative filter of claim 9 wherein the adjacent filter elements have different geometries.

15. A regenerative filter comprising:
a filter housing defining a hollow volume, and having a flow inlet at a bottom of the filter housing and a flow outlet at a top of the filter housing;
a fluid path provided between the flow inlet and the flow outlet;
a plurality of filter elements each having an outer surface filter media applied thereto and functioning to filter particulate or contaminants from the fluid path;
a tube sheet that is disposed within the hollow volume and spans a cross-section of the filter housing that provides the support for the plurality of filter elements;
said plurality of filter elements being disposed in an array in which adjacent filter elements are spaced from each adjacent filter element;
a hold down plate that is disposed over the tube sheet, and in combination with the tube sheet retains the plurality of filter elements;
and an actuation mechanism that is disposed over the tube sheet and that is operable to move the tube sheet and hold down plate between an engagement position wherein the hold down plate is in contact with a flanged connection mounted at the filter housing and an alternate position wherein the hold down plate is out of contact with the flanged connection;
wherein the flanged connection includes a lower tank flange and an upper tank flange that is secured with the lower tank flange, the upper tank flange having an inwardly extending cantilever section, whereby a sealing surface of the hold down plate is urged against the cantilever section of the upper tank flange when the tube sheet is in the engagement position; and
wherein the tube sheet is positioned horizontally below the lower tank flange and distal from the upper and lower tank flanges when in the alternate position.

16. The regenerative filter of claim 15 wherein the tube sheet and the hold down plate are secured to the actuation rod by a fastener at a center of the tube sheet coaxial with the hold down plate.

17. The regenerative filter of claim 15 wherein the lower tank flange is absent any inwardly extending cantilever section such that the tube sheet is free to move vertically within the filter housing, wherein the alternate position is a lowermost position at which both the lower tank flange and the upper tank flange are disposed horizontally above the tube sheet.

18. The regenerative filter of claim 15 wherein the filter housing includes a base housing and a dome and wherein the upper tank flange has an outer securing flange, that is integral with and forms with the cantilever section, a ledge upon which the dome rests, and wherein the outer securing flange of the upper tank flange has a height greater that a height of the cantilever section so as to form the ledge and dispose the outer securing flange of the upper tank flange entirely outside of the dome.

19. The regenerative filter of claim 15 wherein there is a maximum tangential geometric proximity of ⅕ the minimum cross-sectional distance across a single filter element, or less.

* * * * *